(12) United States Patent
Bradford et al.

(10) Patent No.: US 7,303,678 B2
(45) Date of Patent: Dec. 4, 2007

(54) METHOD FOR TREATING WASTEWATER

(75) Inventors: Lawrence J. Bradford, Atlanta, GA (US); Rocky R. White, Lilburn, GA (US)

(73) Assignee: Njun, LLC, Atlanta, GA (US)

( * ) Notice: Subject to any disclaimer, the term of this patent is extended or adjusted under 35 U.S.C. 154(b) by 221 days.

(21) Appl. No.: 11/098,762

(22) Filed: Apr. 4, 2005

(65) Prior Publication Data

US 2006/0219632 A1   Oct. 5, 2006

(51) Int. Cl.
*C02F 3/00* (2006.01)

(52) U.S. Cl. .................. 210/620; 210/255; 210/739; 210/109

(58) Field of Classification Search ............. 210/620, 210/109, 255, 739
See application file for complete search history.

(56) References Cited

U.S. PATENT DOCUMENTS

| | | | |
|---|---|---|---|
| 4,608,157 A | 8/1986 | Graves | 210/86 |
| 5,290,434 A * | 3/1994 | Richard | 210/109 |
| 5,647,986 A | 7/1997 | Nawathe et al. | 210/608 |
| 5,895,566 A | 4/1999 | Tittlebaum et al. | 210/86 |
| 6,113,788 A | 9/2000 | Molof et al. | 210/605 |
| 6,200,472 B1 | 3/2001 | Donald et al. | 210/195.1 |
| 6,409,914 B1 | 6/2002 | Keppeler | 210/151 |
| 6,638,420 B2 | 10/2003 | Tyllilä | 210/86 |
| 6,712,970 B1 | 3/2004 | Trivedi | 210/605 |

* cited by examiner

*Primary Examiner*—Chester T. Barry
(74) *Attorney, Agent, or Firm*—Merchant & Gould

(57) ABSTRACT

A variable process for treating wastewater at a localized sewage treatment system positioned at the site of the wastewater generation is disclosed. Wastewater initially flows from a residence or business into a first operational area of the wastewater treatment system where a majority of the solid material in the wastewater is allowed to separate out of the wastewater. The wastewater is transferred from the first operational area to a second operational area. At a predetermined transfer time, if the wastewater in the second operational area is at least equal to a predetermined transfer volume, a batch of the wastewater is transferred from the second operational area to a third operational area. The batch of wastewater in the third operational area is aerobically treated for an amount of time based on the volume of the batch of wastewater. The treated wastewater is then transferred from the third operational area for dispersal.

41 Claims, 25 Drawing Sheets

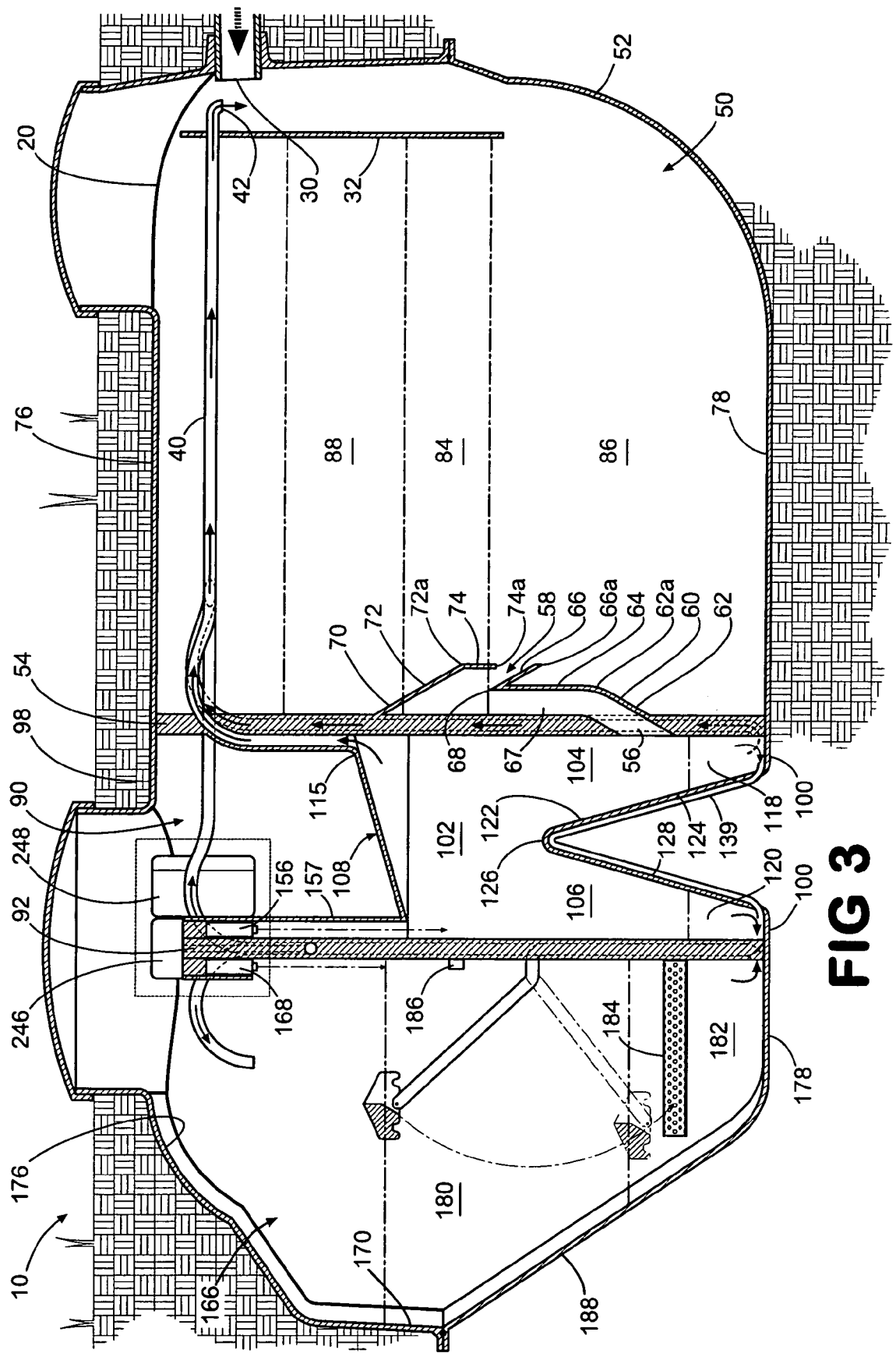

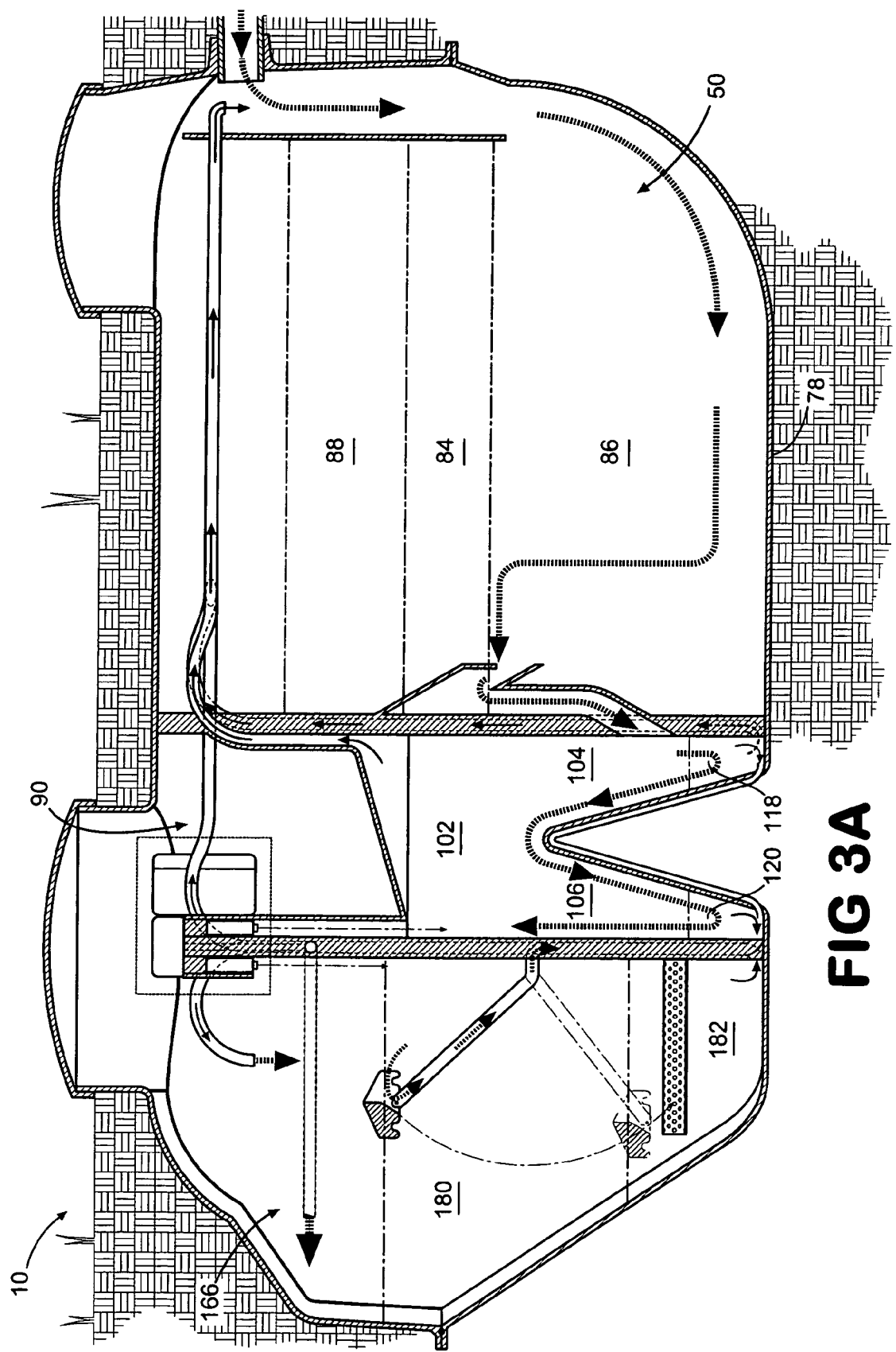

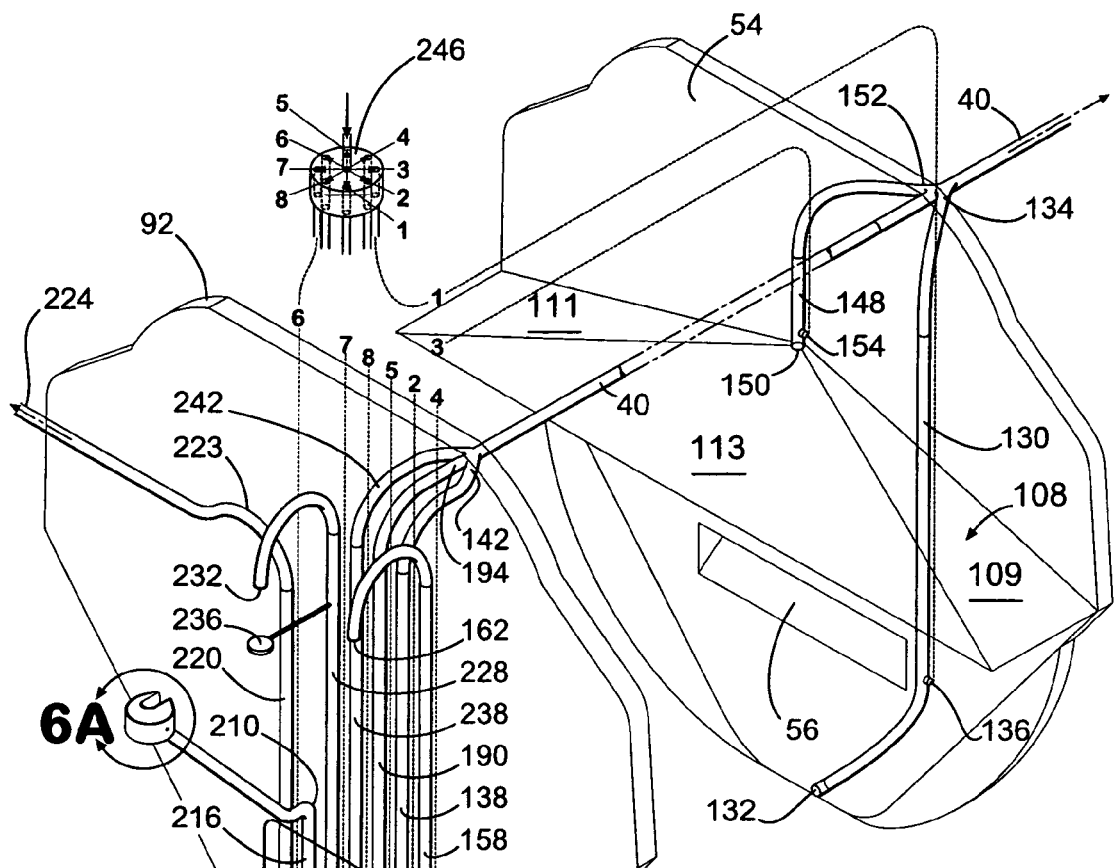
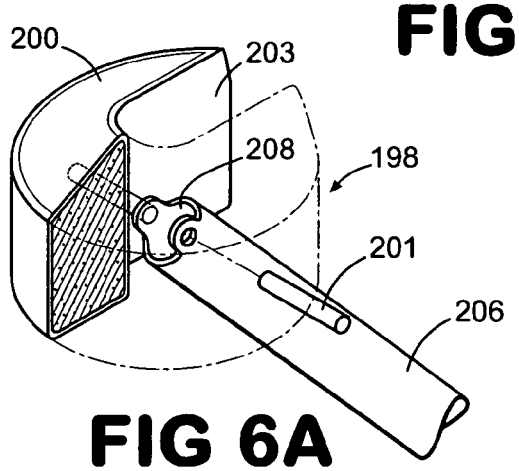
FIG 6
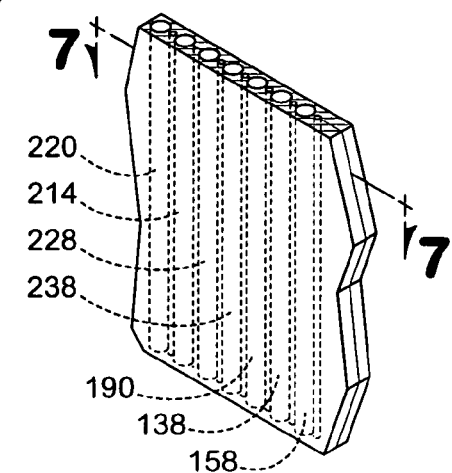
FIG 6B
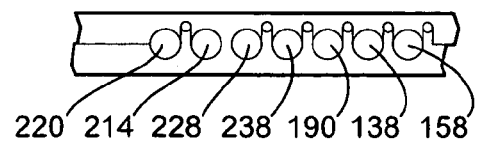
FIG 7
FIG 6A

METHOD FOR TREATING WASTEWATER

BACKGROUND OF THE INVENTION

In order to protect the environment and promote public health, communities require wastewater treatment. The discharge of untreated wastewater is not an option, since it gives rise to numerous environmental concerns. Untreated wastewater contains bacteria that consume high quantities of dissolved oxygen, which is commonly measured as the level of biochemical oxygen demand (BOD) in the water. Thus, when untreated wastewater is released into either aboveground or belowground streams and aquifers, the level of dissolved oxygen in the water of the streams and aquifers begins to deplete, which endangers the water bodies themselves and the resident plant and aquatic life. Over time, the bacteria of the untreated wastewater will deplete the dissolved oxygen in the water to a level that will not support plant and aquatic life.

To treat wastewater, communities in highly populated areas commonly collect wastewater and transport it through a series of underground pipes to a centralized wastewater treatment plant. However, there are several problems associated with centralized treatment plants. Centralized wastewater treatment plants are designed and rated for processing a specific flow rate of wastewater per day, typically expressed as the rated capacity of the plant, and all treatment plants have a maximum flow rate capacity. Thus, if a centralized treatment plant receives more wastewater on a particular day than what the plant was designed to handle, problems are encountered. For instance, when a treatment plant receives larger-than-normal amounts of untreated raw wastewater, a portion of the untreated wastewater must be diverted into a body of water, such as a river, in order not to exceed the amount of wastewater the plant was designed to handle. As discussed above, discharge of this untreated wastewater into bodies of water will eventually endanger and kill resident plant and aquatic life in the water. Untreated wastewater also contains a number of disease pathogens that are extremely harmful to humans. For instance, untreated wastewater is one of the leading causes of dysentery, which can be life threatening if not properly treated. Thus, if a significant amount of untreated wastewater is discharged into a body of water, that body of water will become unavailable for human consumption. On the other hand, if the treatment plant processes the larger-than-normal amounts of untreated wastewater, instead of diverting a portion into a body of water, the influx of untreated wastewater would wash away the bacteria populations used by the plant to treat the untreated wastewater, which would disrupt the entire biological treatment process of the plant.

Larger-than-normal amounts of untreated wastewater commonly occur because of growth in commercial and residential developments beyond what the centralized wastewater treatment plants were designed to accommodate and because of large amounts of rainfall in a short period of time. Moreover, sewage lines connecting residences and businesses to centralized wastewater treatment plants often develop breaks and cracks which allow rainwater and ground water to seep into the sewage lines. This phenomenon, known as sewage line infiltration, also causes larger-than-normal amounts of wastewater to flow into the centralized treatment plants. Wastewater treatment plants require tremendous community resources in order to accommodate the demands and challenges generated by community growth and development. Often, these resources are not immediately available, and the existing treatment plants are not able to properly treat the increased flow rate of untreated wastewater.

In more rural areas, construction of centralized wastewater treatment plants may be too expensive to build and maintain. In addition, the cost of connecting residences and businesses in rural areas to a centralized treatment plant via sewage lines may be impracticable due to the greater distance between the those residences and businesses. In such areas septic systems are usually utilized to treat wastewater. A septic tank is typically a large tank located underground on an owner's property. Septic tanks are categorized as continuous flow systems because wastewater flows into the septic tank at one end, and the same amount of wastewater that entered will exit the tank at the other end. The purpose of a septic tank is to retain any solids in the wastewater and to allow the liquid wastewater to pass through to prevent field lines leading from the septic tank to a drain field from becoming clogged. However, since the wastewater leaving the septic tank has not been treated, the wastewater will be a detriment to the environment, as discussed above. Furthermore, as solids build up inside the septic tank, a phenomenon known as periodic upset may occur, causing solids to flow out of the septic tank and into the field lines connected to the tank. Eventually, these field lines will clog due to the buildup and carryover of solids. When this occurs, the field lines have to be excavated and cleaned, which means destruction to a portion of the owner's property as well as increased expense to the owner.

Because wastewater leaving a septic tank has not been treated, drain fields covering a certain minimum area of soil are required to filter the wastewater. That minimum area is influenced by factors including the amount of wastewater produced by the household and the soil percolation rate. Different kinds of soil have different percolation rates, and a larger or smaller drain field will be required depending on the characteristics of the soil. Because the percolation rate of soil determines the minimum lot size in a subdivision using septic tanks, the requirement for larger minimum lots where percolation is relatively poor reduces the maximum number of lots available in that subdivision, and the resulting increase in the cost of those lots is passed on to the home buyers.

In view of the problems encountered with using septic tanks to handle wastewater, on-site alternative wastewater treatment systems have been proposed in attempt to cure the deficiencies of septic tanks. Similar to septic tanks, these commercially available on-site alternative wastewater treatment systems use a static or fixed process to treat wastewater. In particular, these on-site alternative treatment systems utilize the same process, every day, at every residence and business to treat wastewater. However, in order to properly treat wastewater generated at a residence or business, a proper biological balance must be maintained. A variable process is needed because the amount of wastewater generated at a particular residence or business changes daily, the times when wastewater is generated and flows out of a particular residence or business change daily, and the composition of wastewater generated by a particular residence or business changes daily. When one of these factors changes, the process must also be capable of changing to accommodate the variations in the flow of wastewater. Thus, since the flow of wastewater at a particular residence or business fluctuates daily from the maximum to none at all, a treatment system must be able to provide a different process every day to properly treat the wastewater. Since on-site alternative treatment systems employ a static or fixed process to treat wastewater, they do not take into consideration these variable characteristics inherent in the treatment of wastewater and, thus, also fail to properly treat wastewater.

A number of the commercially available on-site wastewater treatment systems utilize the continuous flow system discussed above with regard to septic tanks. In a continuous flow system, no wastewater leaves the system unless wastewater enters the system, and unlike at a centralized wastewater treatment plant, there is no operator available at these on-site treatment systems to determine and adjust to changes in flow rate of wastewater entering the systems. Therefore, if a residence or business does not generate any new wastewater for a period of time, such as for several hours or a couple of weeks, the wastewater in these on-site treatment systems remains in the systems because no new wastewater is available to push any wastewater out of the systems.

To treat wastewater, these on-site treatment systems either continuously aerate, or aerate at set periodic times such as every four, eight, or twelve hours, the wastewater. However, in continuous flow systems, there is nothing available to separate the untreated wastewater from the treated wastewater or to distinguish wastewater that has not been treated from wastewater that has been treated, once the two are mixed. Consequently, untreated wastewater is often discharged from continuous flow systems because of this lack of control over what actually gets pushed out of the systems.

Even though the flow of wastewater, the timing of the flow, and the composition of the flow all change daily, the current on-site alternative treatment systems use the same process every day to treat wastewater. For instance, while the wastewater is within these on-site treatment systems, it is either continuously aerated, or aerated at set periodic times, such as every four, eight, or twelve hours, without taking into consideration the amount of wastewater in the system or the population of microorganisms in the system. Therefore, wastewater leaving these on-site alternative systems is typically not sufficiently treated either because it was not aerated for a long enough period of time, or because it was aerated for too long a period of time, which causes the microorganisms in the systems to remain suspended in the wastewater as it is discharged from the systems. Thus, the on-site alternative wastewater treatment systems that utilize the continuous-flow method to treat wastewater fail to maintain the correct biological balance needed to properly treat wastewater because the process utilized by the systems is not capable of changing to accommodate the variable characteristics of wastewater treatment including different wastewater flows, different times of wastewater generation, and different wastewater concentration.

Other on-site alternative wastewater treatment systems utilize a pump configuration to transfer wastewater throughout the systems. Although these systems may control when wastewater is discharged from the systems, the systems do not control what is actually getting discharged from the systems because, like the continuous flow systems, there is nothing available in the pump systems to separate the untreated wastewater from the treated wastewater or to distinguish wastewater that has not been treated from wastewater that has been treated, once the two are mixed. As a result, untreated wastewater is often discharged from the pump systems. Further, pump treatment systems use the same process every day to treat wastewater, even though the flow of the wastewater, timing of the flow, and composition of the flow all change daily. This failure to accommodate the changing characteristics of wastewater is another reason why available pump treatment systems often discharge improperly treated wastewater. Moreover, pump systems are expensive to maintain because certain objects commonly found in wastewater often clog the pumps and valves required to control the flow of wastewater through the system, causing frequent maintenance and replacement.

Further, many of the on-site alternative wastewater treatment systems require the property owners to perform daily or periodic adjustments to the systems. Such maintenance is expensive and also cumbersome to the property owner, who is typically inexperienced with regard to wastewater treatment. Often, property owners are not able to determine what the problem is with the system because of the sophistication of the wastewater treatment process. This sophistication also causes property owners not to want to get involved with any daily or periodic adjustments to the system.

Accordingly, a variable process capable of changing daily is needed to accommodate the variations inherent in wastewater treatment which include the rate of flow of wastewater, the timing of the flow of wastewater, and the composition of the wastewater.

SUMMARY OF THE INVENTION

Stated in general terms, the present invention comprises a variable process for treating wastewater at a localized sewage treatment system positioned at the site of the wastewater generation. According to an embodiment of the present invention, wastewater flows from a first operational area to a second operational area, where the volume of the wastewater is monitored. When the volume of the wastewater in the second operational area is at least equal to a default volume, a batch of wastewater is transferred from the second operational area to a third operational area for treatment.

In accordance with another embodiment of the present invention, a transfer volume is determined based on the volume of wastewater received in the second operational area over a period of time. Moreover, a transfer time is determined based on when the volume of wastewater is received in the second operational area. If, at the transfer time, the volume of the wastewater in the second operational area is at least equal to the transfer volume, then a batch of wastewater having a volume equal to the transfer volume is transferred to a third operational area for treatment. If, at the transfer time, the volume of wastewater in the second operational area is less than the transfer volume, then wastewater continues to accumulate in the second operational area until the volume of the wastewater is at least equal to the transfer volume. In another embodiment, if, at the transfer time, the volume of the wastewater in the second operational area is less than the transfer volume, then a batch of wastewater having a volume less than the transfer volume is transferred to the third operational area for treatment.

In an embodiment of the present invention, after the batch of wastewater is transferred to the third operational area, certain nutrients are removed from the wastewater during an anoxic period. At the conclusion of the anoxic period, the batch of wastewater is aerated for predetermined amount of time based on the volume of the batch of wastewater and the population of microorganisms in the third operational area. After aeration, the batch of wastewater is clarified for a predetermined amount of time to allow the population of microorganisms to settle out of the wastewater. The treated wastewater is then removed from the third operational area for dispersal.

In another embodiment of the present invention, when the batch of wastewater is transferred from the second operational area to the third operational area, a predetermined volume of wastewater is reserved in the second operational area. If, at the transfer time, no additional wastewater has accumulated in the second operational area, then the reserved volume of wastewater is transferred to the third operational area for treatment. If, after the reserved volume of wastewater is treated, no wastewater has accumulated in the second operational area, then the reserved volume of wastewater is transferred to the first operational area, where the reserved wastewater flows over to the second operational area. If, at the transfer time, no additional wastewater has accumulated in the second operational area, then the reserved volume of wastewater is transferred from the second operational area to the third operational area for further treatment to maintain the population of microorganisms in the third operational area.

In yet another embodiment, while the batch of wastewater is being aerated in the third operational area, the volume of the wastewater in the second operational area is determined. If the volume of the wastewater in the second operational area is at least equal to the transfer volume, then aeration of the batch of wastewater is stopped prior to the expiration of the predetermined amount of aeration time. The batch of wastewater is then clarified for an amount of time shorter than the predetermined amount of clarification time.

BRIEF DESCRIPTION OF THE DRAWINGS

FIG. 3 is a cross-sectional view of the wastewater treatment system taken along lines 3-3 in FIG. 2;

FIG. 3A is a cross-sectional view of the wastewater treatment system as in FIG. 3 with arrows showing exemplary liquid flow throughout the system;

FIG. 6 is an exploded view of an airlift system of the wastewater treatment system shown in FIG. 1;

FIG. 6A is an enlarged view of a float assembly taken at inset 6A in FIG. 6;

FIG. 6B is an enlarged view of a portion of the airlift system taken at inset 6B in FIG. 6;

FIG. 7 is a cross-sectional view of the airlift system taken along lines 7-7 in FIG. 6B but showing an alternate pipe layout in which the liquid pipes are in a separate plane from the air pipes;

DETAILED DESCRIPTION OF THE PREFERRED EMBODIMENT

Figure 1:
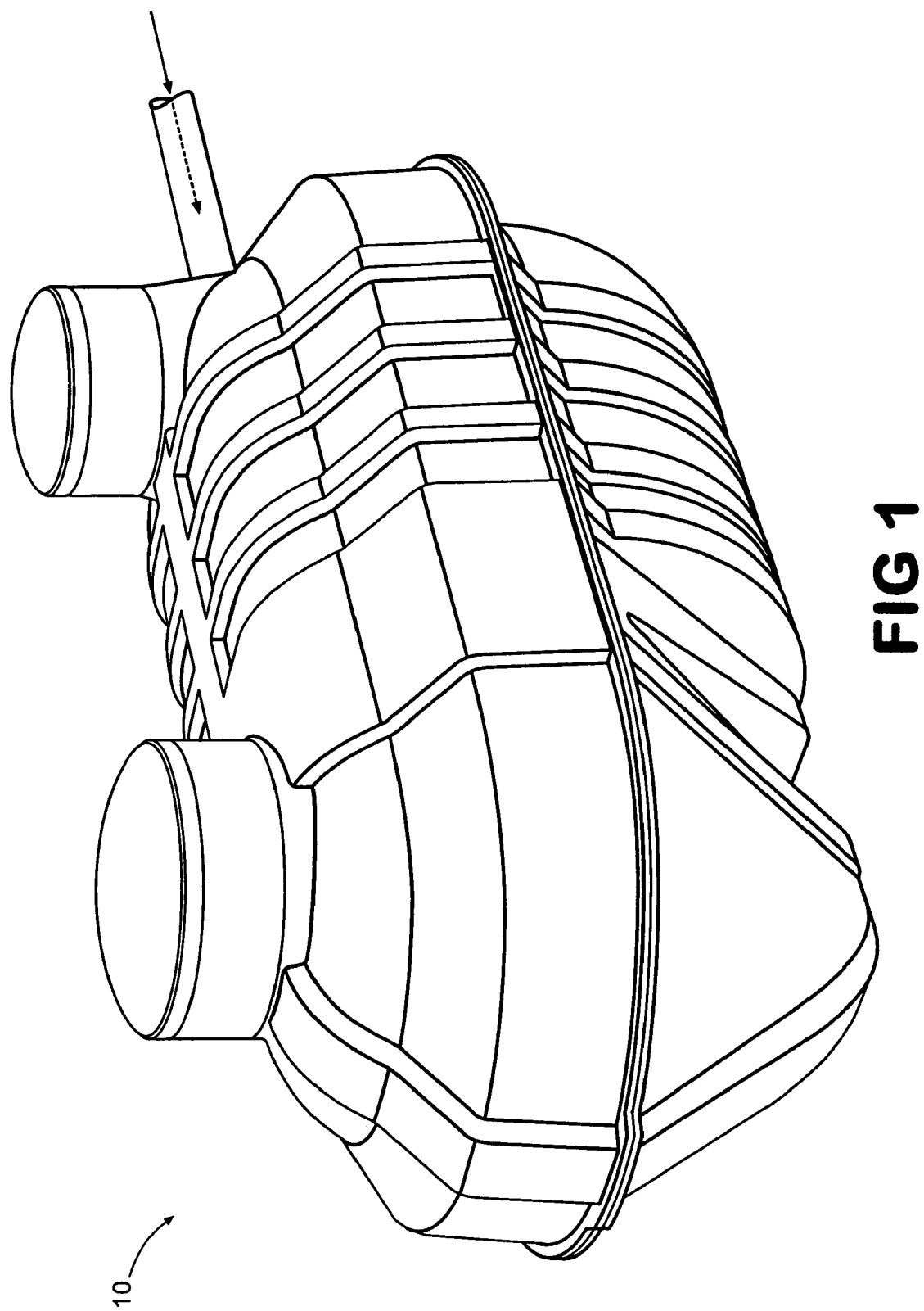
FIG. 1 is a perspective view of a wastewater treatment system according to a preferred embodiment of the present invention.

There are typically two types of solids present in wastewater. The first is inorganic solids, which do not break down or decompose by biological treatment. The inorganic content in wastewater is typically very small. The second type of solids typically present in wastewater is organic solids. Aerobic biological treatment processes, such as those used by certain embodiments of the present invention, rely on a population of microorganisms to break down the organic solids. A wastewater treatment system according to the present invention must, therefore, grow and maintain a population of bacteria in order to consume the organic waste. Under aerobic conditions, the reduced organic compounds are oxidized to end products of carbon dioxide and water.

An embodiment of a wastewater treatment system according to the present invention is shown in FIGS. 1-5. Wastewater in the form of raw sewage is supplied as influent to a localized wastewater treatment system 10 comprising a tank 20 through an inlet opening 30 at one end of the tank. The tank 20 has a plurality of chambers, each chamber having a plurality of areas for treating wastewater. The influent typically flows through a series of pipes leading from a building or residence to the localized treatment system. After passing through the inlet opening 30, the wastewater enters a receiving chamber 50 having a first side wall 52 curving downwardly toward a bottom 78, a second side wall 54 opposing the first side wall, a front wall, a rear wall opposing the front wall, and a top 76 opposing the bottom. The entering wastewater encounters a baffle 32 just inside the inlet opening 30, which slows the flow rate velocity of the arriving wastewater entering the receiving chamber 50 and directs the wastewater downwardly toward the curved first side wall 52 and the bottom 78 of the receiving chamber, as indicated by the directional arrows in FIG. 3A. At this slower inflow rate, the wastewater begins naturally separating into wastewater constituents, including solid and liquid material.

Figure 10A:
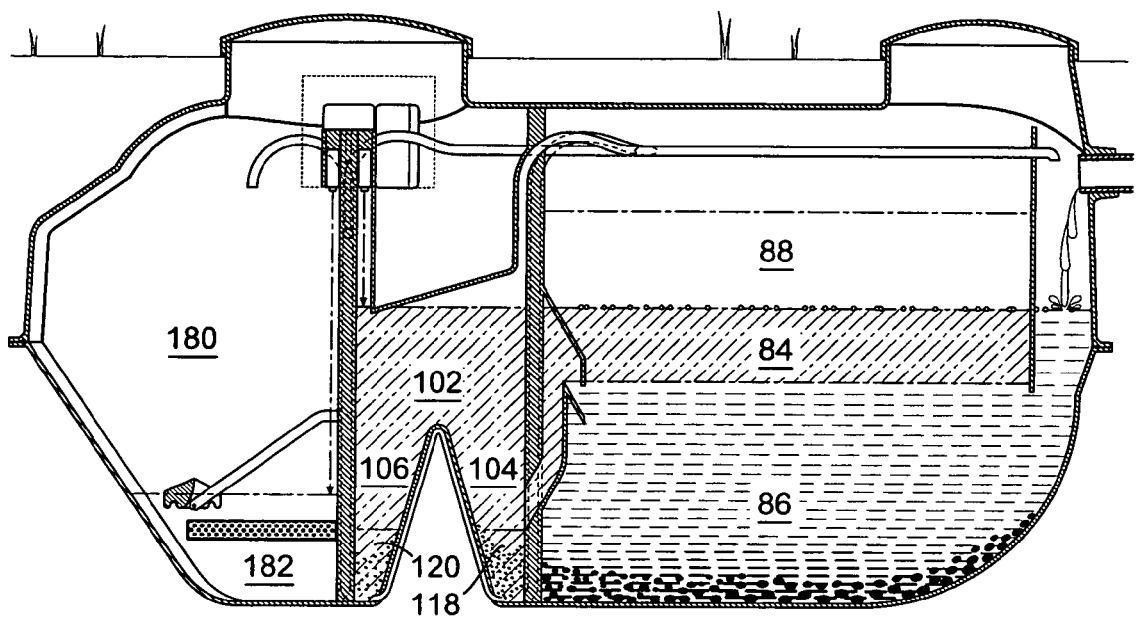
FIGS. 10A-10M are longitudinal cross-sectional elevation views of the wastewater treatment system in FIG. 1 showing exemplary liquid flow through the system.

Located within the receiving chamber 50 are a first operational area 84 at an intermediate elevation within the receiving chamber for receiving the flow of wastewater entering the system, a holding area 88 above the first operational area for accommodating occasional peak-flow demands, and a first solids settling area 86 at the lowermost portion of the receiving chamber for receiving solid material settling out of the wastewater. As the wastewater flows into the receiving chamber 50 of an empty tank 20, the wastewater begins filling the first solids settling area 86. Solid material in the wastewater, will either float to the surface of the wastewater or settle to the first solids settling area 86, depending on the density of the solid material, as illustrated in FIG. 10A. As this separation is occurring, additional wastewater entering the receiving chamber 50 through the inlet opening 30 mixes with the wastewater already in the receiving chamber, preventing the wastewater from becoming stagnant and septic. Some degree of anaerobic biological treatment of organic material contained in the wastewater may naturally take place inside the receiving chamber 50.

Figure 5:
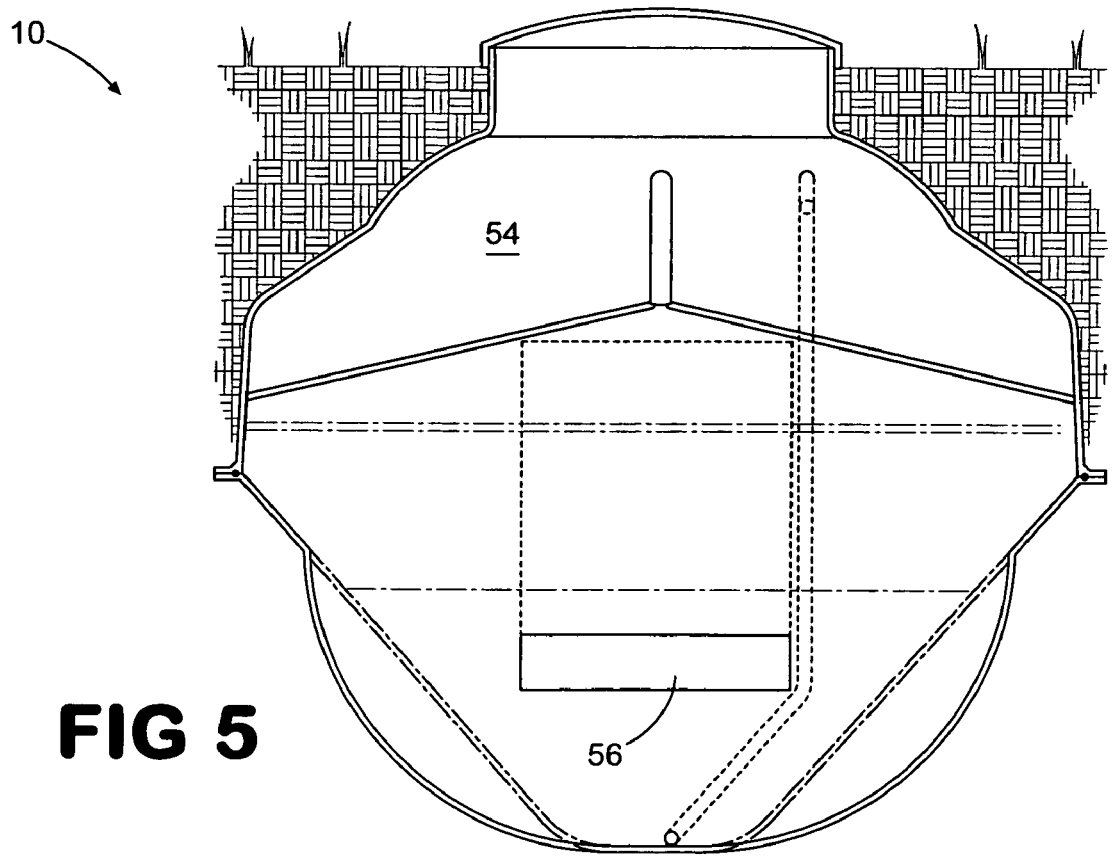
FIG. 5 is a cross-sectional view of the wastewater treatment system taken along lines 5-5 in FIG. 2.

The second side wall 54 of the receiving chamber 50 defines an outlet opening 56 at a level below the first operational area 84, shown in FIGS. 5 and 6, for transferring the wastewater from the first operational area to an equalization chamber 90 at an intermediate location within the tank 20. Positioned around the outlet opening 56 is a filter passage 58 comprising a lower baffle 60 and an upper baffle 70 for inhibiting settleable and floatable solid material in the receiving chamber 50 from flowing over into the equalization chamber 90 with the wastewater and for diverting the wastewater from the first operational area 84 to the outlet open. The lower baffle 60 includes a first inclined wall portion 62 extending upwardly at an acute angle from the second side wall 54 to a distal edge 62a spaced apart from the second side wall, and a vertical wall portion 64 extending upwardly from the distal edge 62a to an upper edge joining a second incline wall portion 66 extending downwardly at an acute angle from the upper edge of the vertical wall portion to a lower edge 66a. The vertical wall portion 64 and the second incline wall portion 66 thus intersect at an apex 68 that defines the interface between the first solids settling area 86 and the first operational area 84 located immediately above the first solids settling area.

The upper baffle 70 includes an incline wall portion 72 extending downwardly at an acute angle from the second side wall 54 to a distal edge 72a, and a vertical portion 74 extending downwardly from the distal edge of the incline wall portion to a lower edge 74a. The lower edge 74a of the vertical wall portion 74 preferably extends below the apex 68 of the lower baffle 60 and is spaced apart from that apex. The open area 67, between the lower edge 74a of the vertical wall portion 74 for the upper baffle 70 and the second inclined wall portion 66 of the lower baffle 60, thus defines the flow passageway from the first operational area 84 to the outlet opening 56 leading to the equalization chamber 90. The upper baffle 70 ensures that any solid material settling out of wastewater above the upper baffle in the receiving chamber 50 will continue moving downwardly and settle into the first solids settling area 86.

As the wastewater continues to fill the first solids settling area 86, the wastewater begins to enter the open area 67 and contact the second incline wall portion 66 of the lower baffle 60. The second incline wall portion 66 ensures that any solid material settling in that open area 67 is urged downwardly into the first solids settling area 86. Furthermore, floating material that might rise from the first solids settling area 86 is trapped under the second incline wall portion 66 or passes by the open area 67 on ascent to the surface of wastewater rising to the first operational area 84, rather than transferring over to the equalization chamber 90 with the wastewater from the first operational area 84. All floating material in the receiving chamber 50 thus will remain in the first operational area 84 or in the holding area 88, as the water level can never fall below the level of the apex 68, as illustrated in FIGS. 10A-M. Accordingly, the wastewater level in the receiving chamber 50 can go no lower than approximately the lower edge 74a of the vertical portion 74, trapping the floating material in areas 84 and 88. As the wastewater rises above the level defined by the apex 68, the wastewater begins flowing through the open area 67, down the vertical wall portion 64 and the first incline wall portion 62 of the lower baffle 60, and into the equalization chamber 90 through the outlet opening 56 at the lower end of the lower baffle, as indicated by the directional arrows in FIG. 3A.

The equalization chamber 90 is separated from the receiving chamber 50 by the second side wall 54 and includes a third side wall 92 opposing the second side wall, a front wall, a rear wall opposing the front wall, a top 98, and a bottom 100 opposing the top. The equalization chamber 90 comprises a second operational area 102 for receiving the flow of wastewater from the first operational area 84 of the receiving chamber 50, and a second solids settling area 118 and a third solids settling areas 120 below the second operational area for receiving any remaining solid material settling out of the wastewater in the equalization chamber. In an embodiment of the present invention, the equalization chamber 90 may also include a funnel assembly 108 located toward the upper end of the equalization chamber for urging any floating solid material at the surface of the wastewater in the equalization chamber to a third airlift pump, as further described below. As the wastewater flows into the equalization chamber 90 and begins filling the second operational area 102, the wastewater contacts a partition 122 dividing a lower portion of the second operational area into a first valley region 104 and a second valley region 106. The partition 122 includes an incline 124 extending from the bottom 100 of the equalization chamber 90 to an apex 126, and a complementary incline 128 extending from the apex to the bottom 100 of the equalization chamber. The first incline portion 62 of the lower baffle 60 and the incline 124 of the equalization chamber 90 cause solid material settling out of the wastewater in the second operational area 102 to move towards the second solids settling area 118 located at the bottom of the first valley region 104, as illustrated in FIGS. 3 and 10A.

Figure 10B:
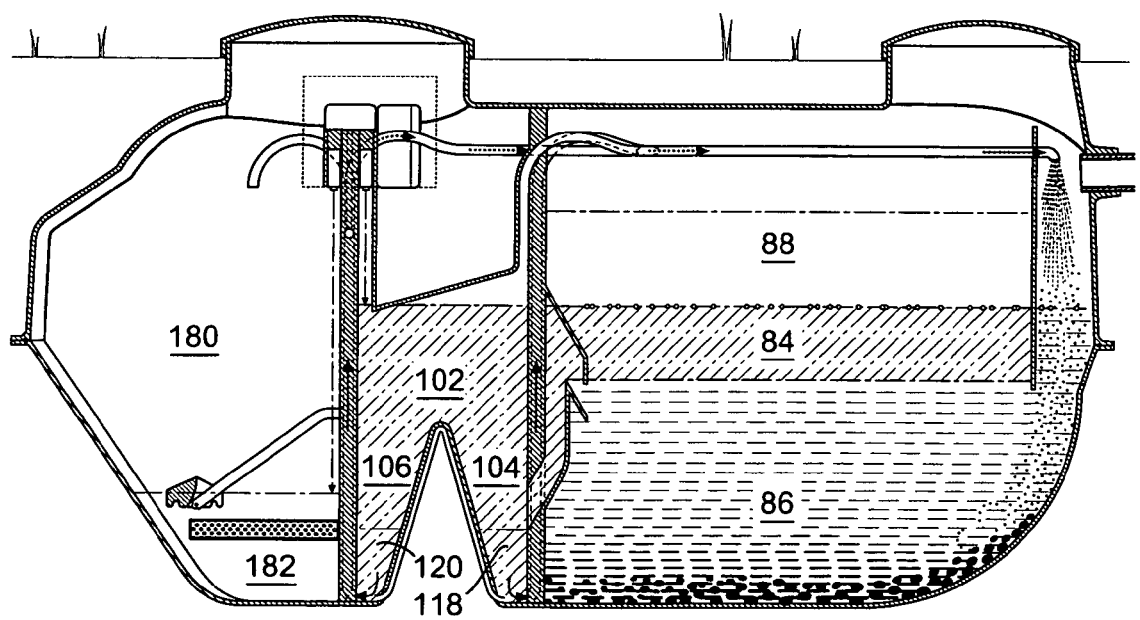
Figure 11:
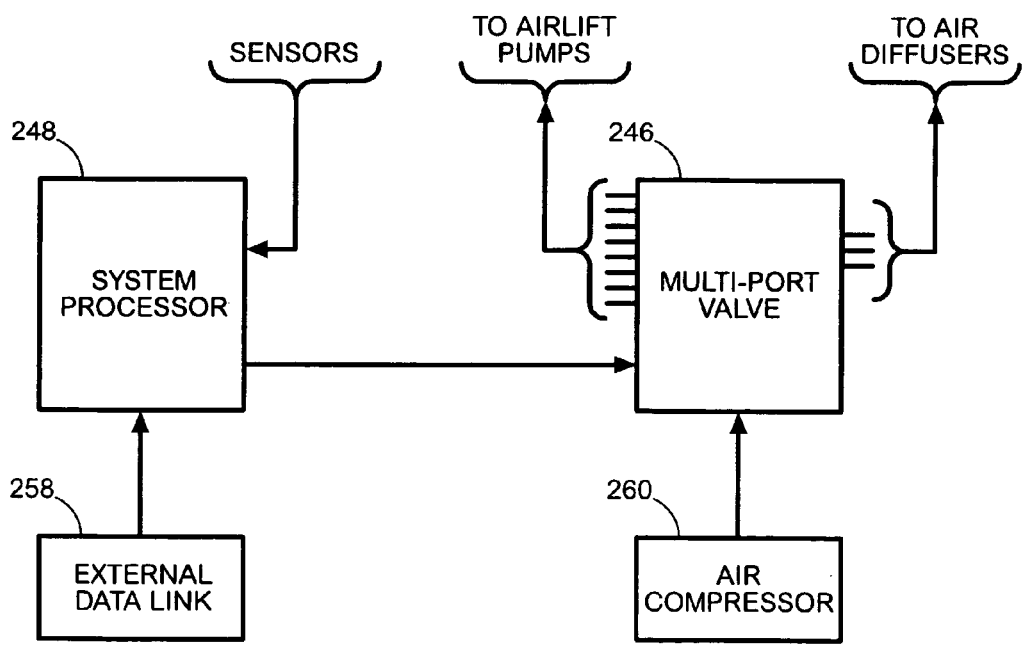
FIG. 11 is a block diagram showing the association between a system processor, a multi-port valve, an air compressor, sensors, airlift pumps, and air diffusers for the present invention.
Figure 12A:
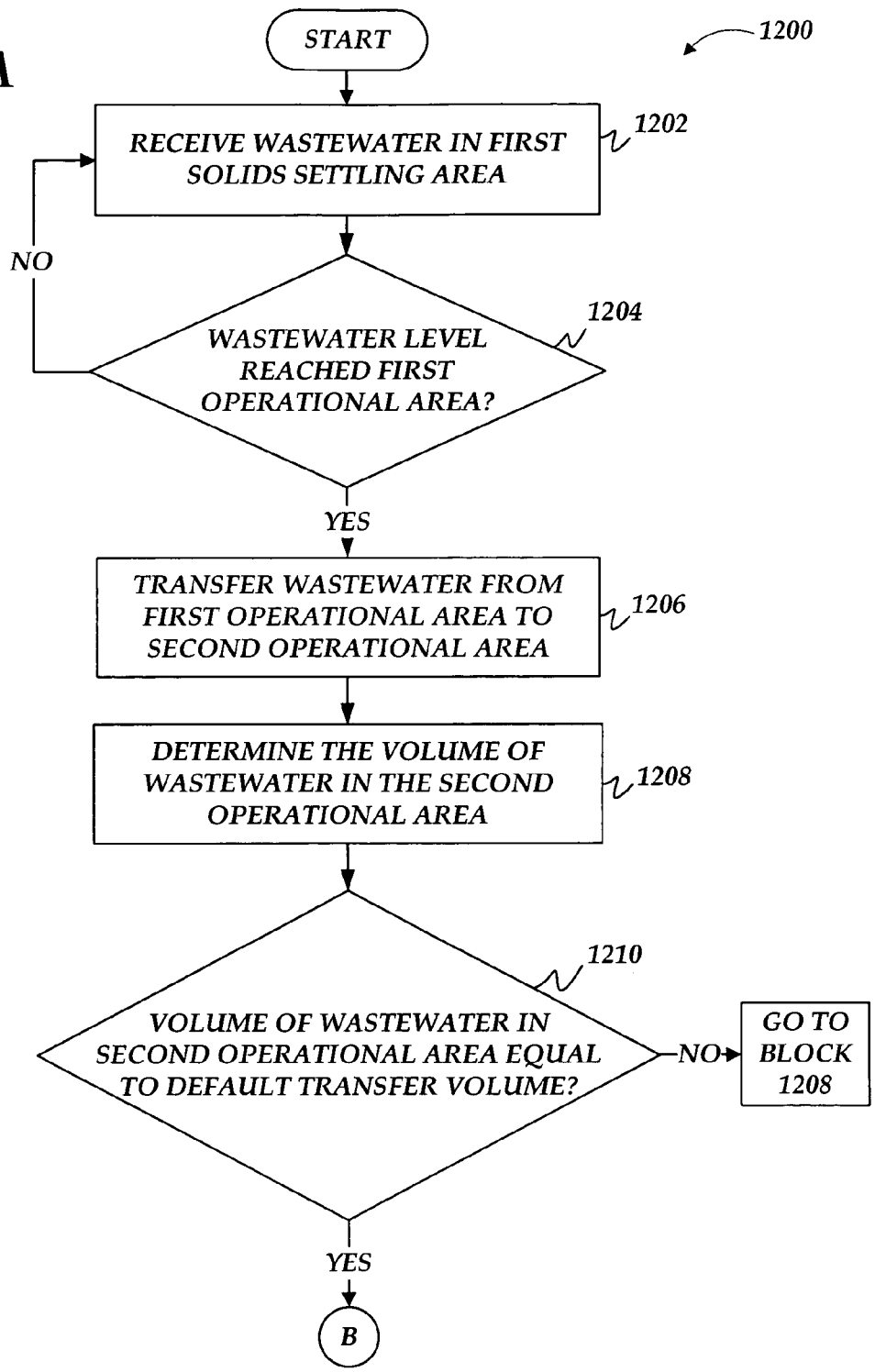
FIGS. 12A-12D are flow diagrams showing an illustrative start-up process for treating wastewater according to a preferred embodiment of the present invention.
Figure 12B:
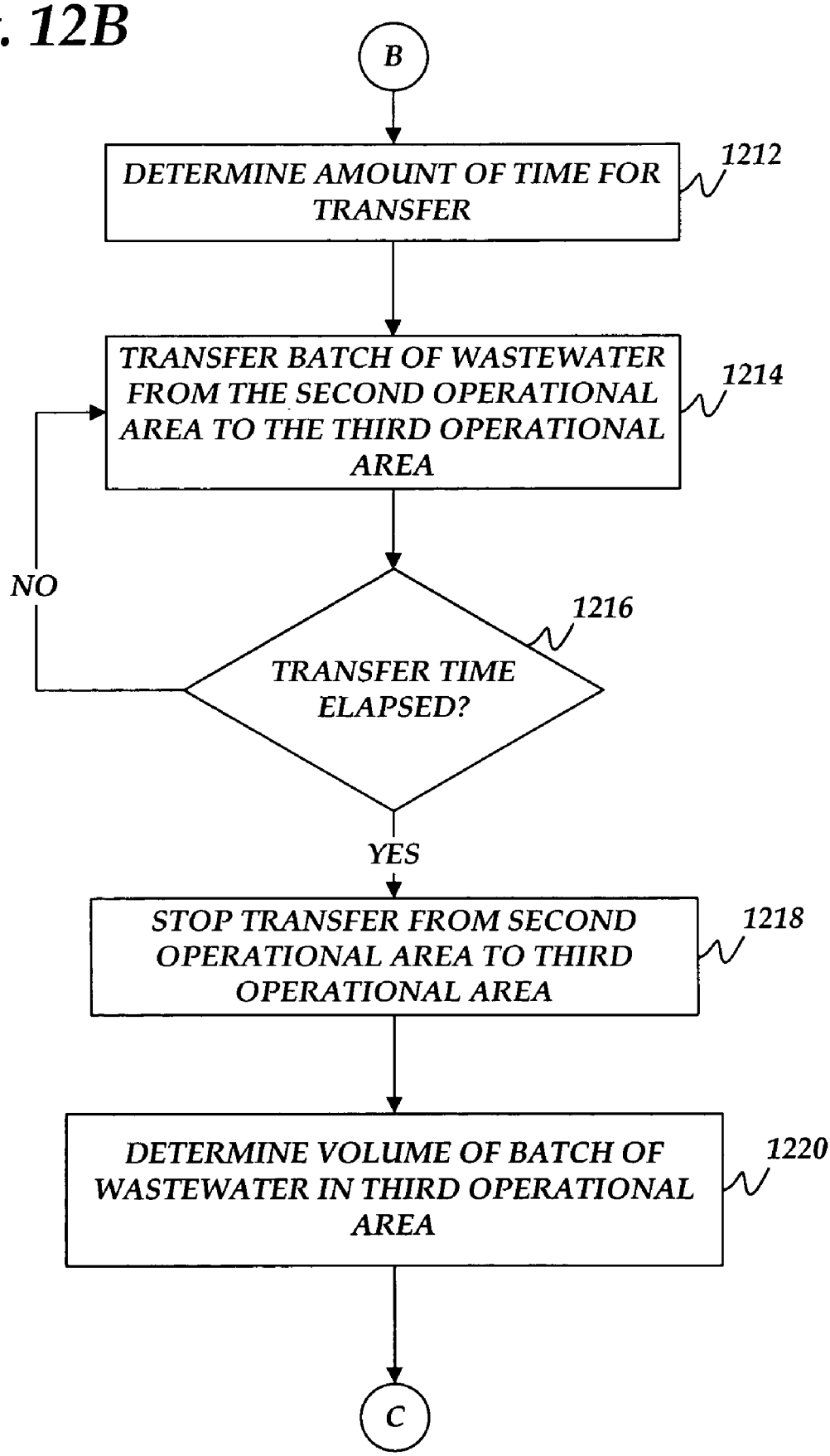
Figure 12C:
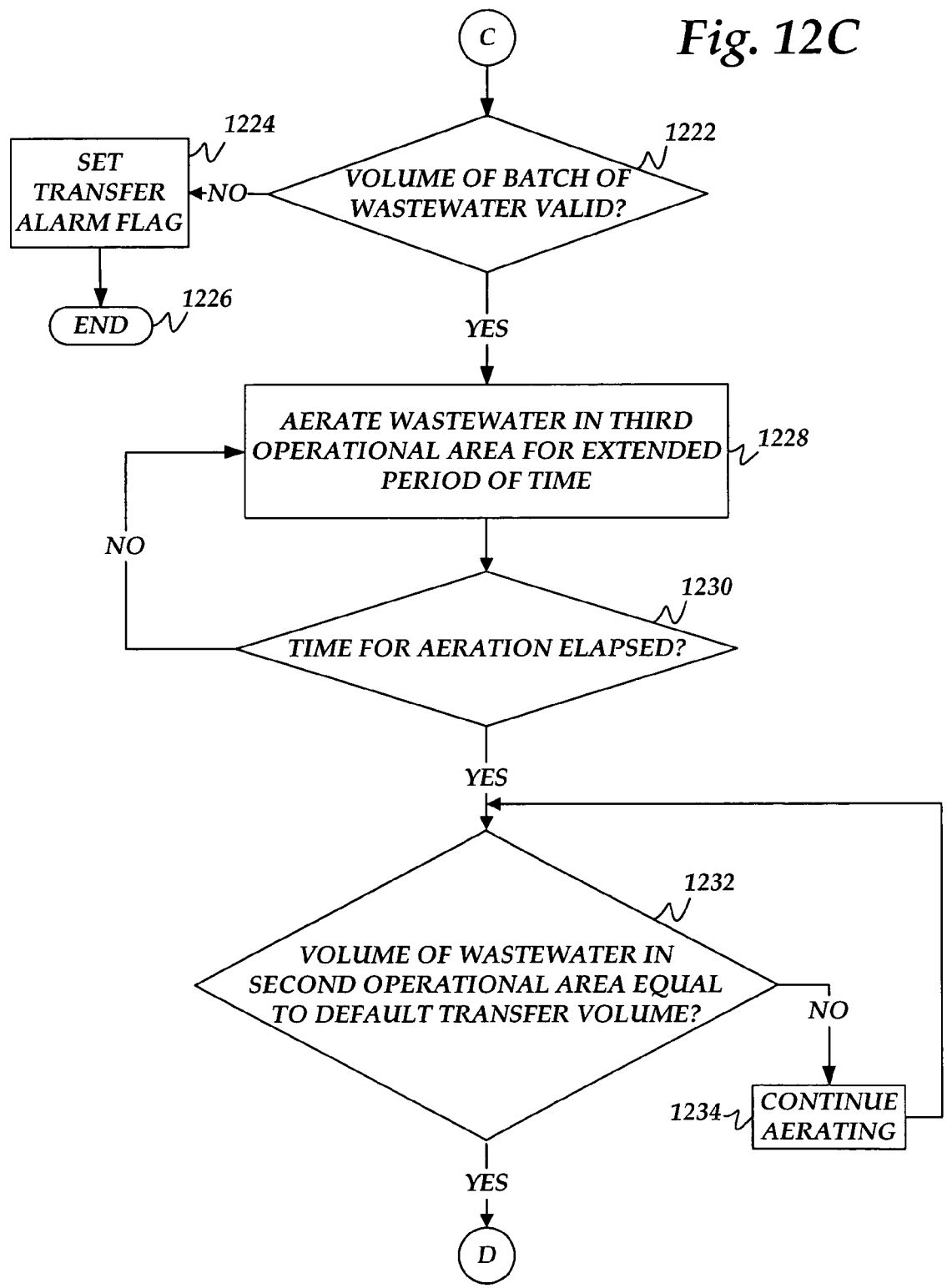
Figure 12D:
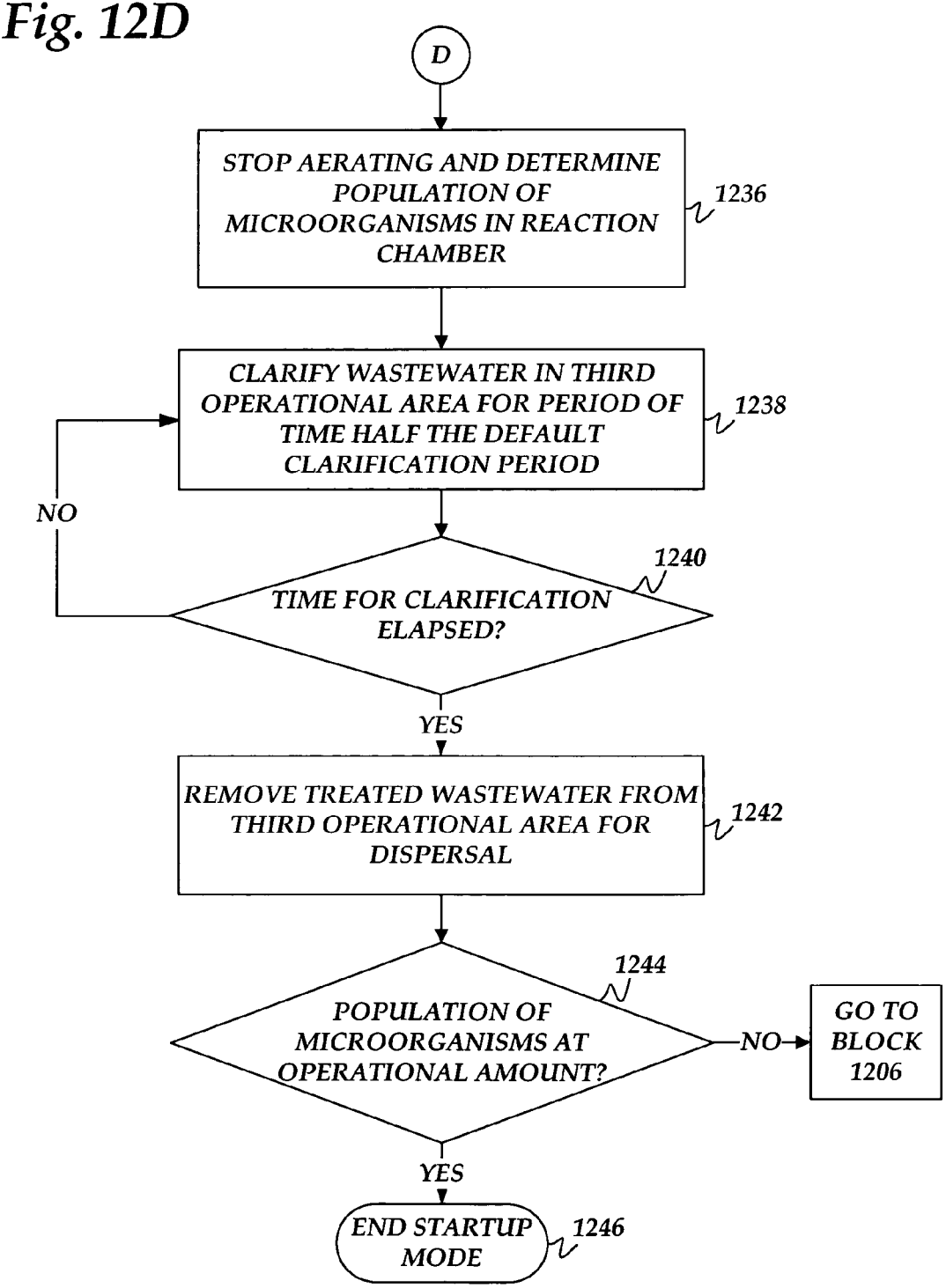
Figure 13A:
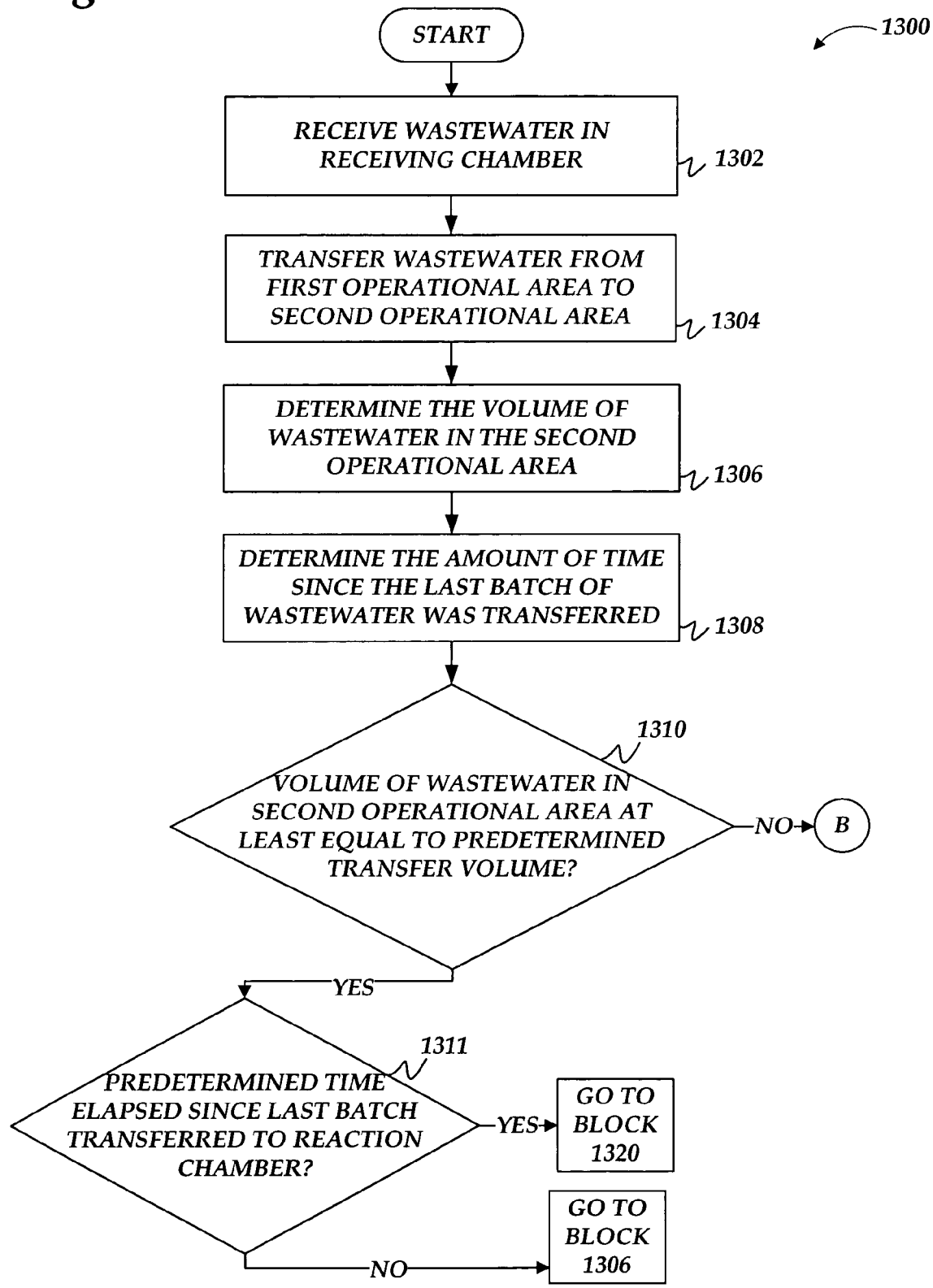
FIGS. 13A-13G are flow diagrams showing an illustrative operational process for treating wastewater according to a preferred embodiment of the present invention.
Figure 13B:
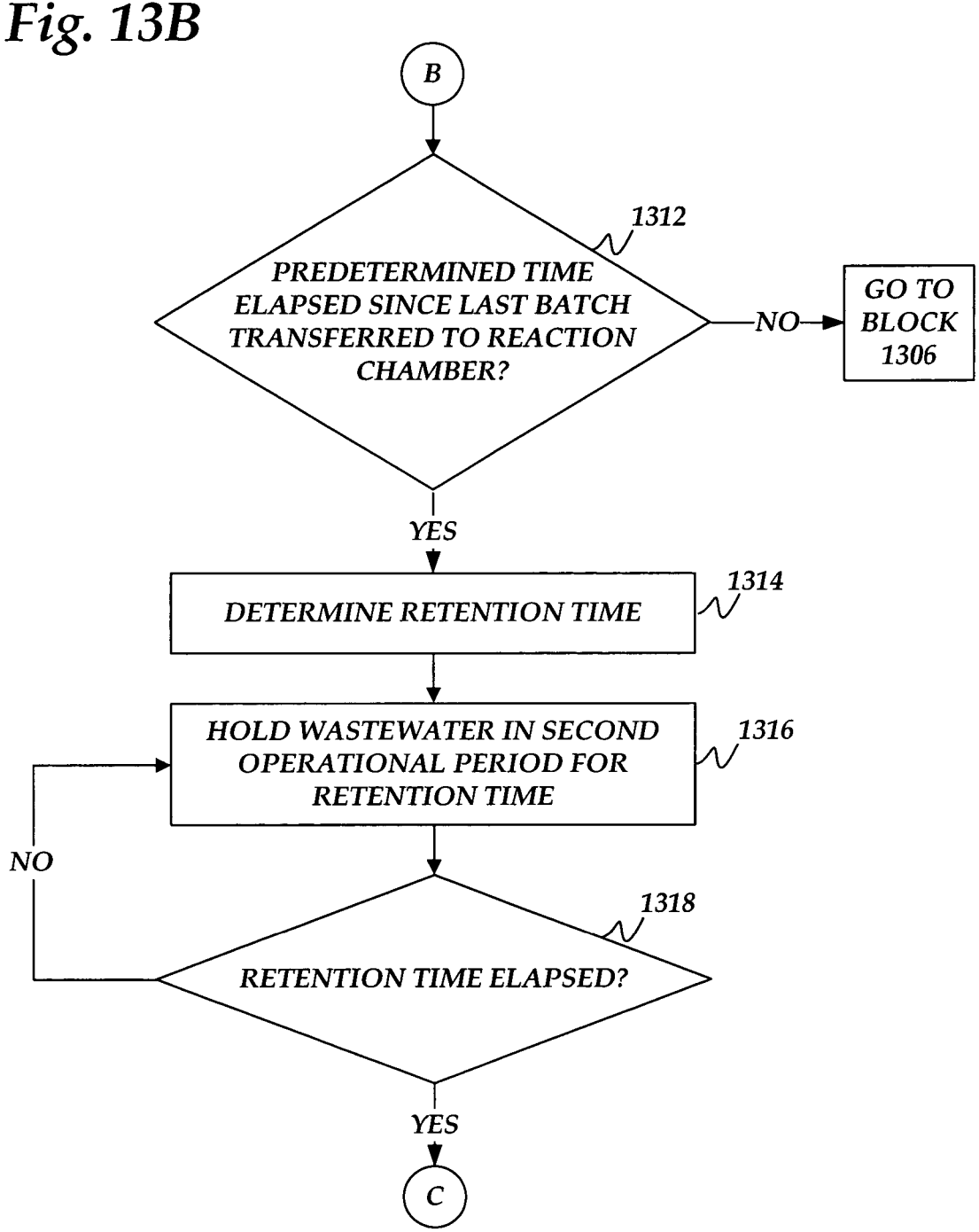
Figure 13C:
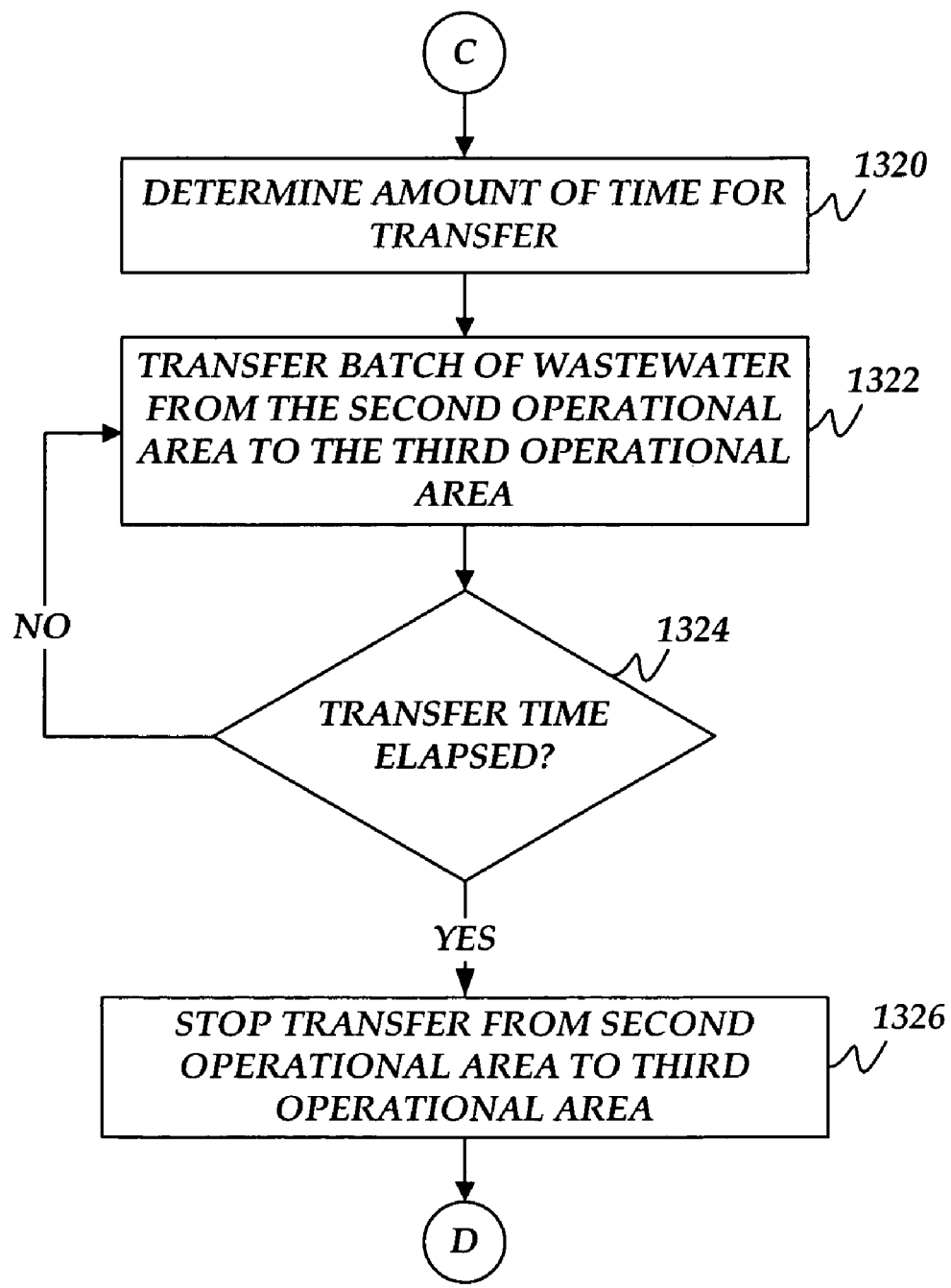
Figure 13D:
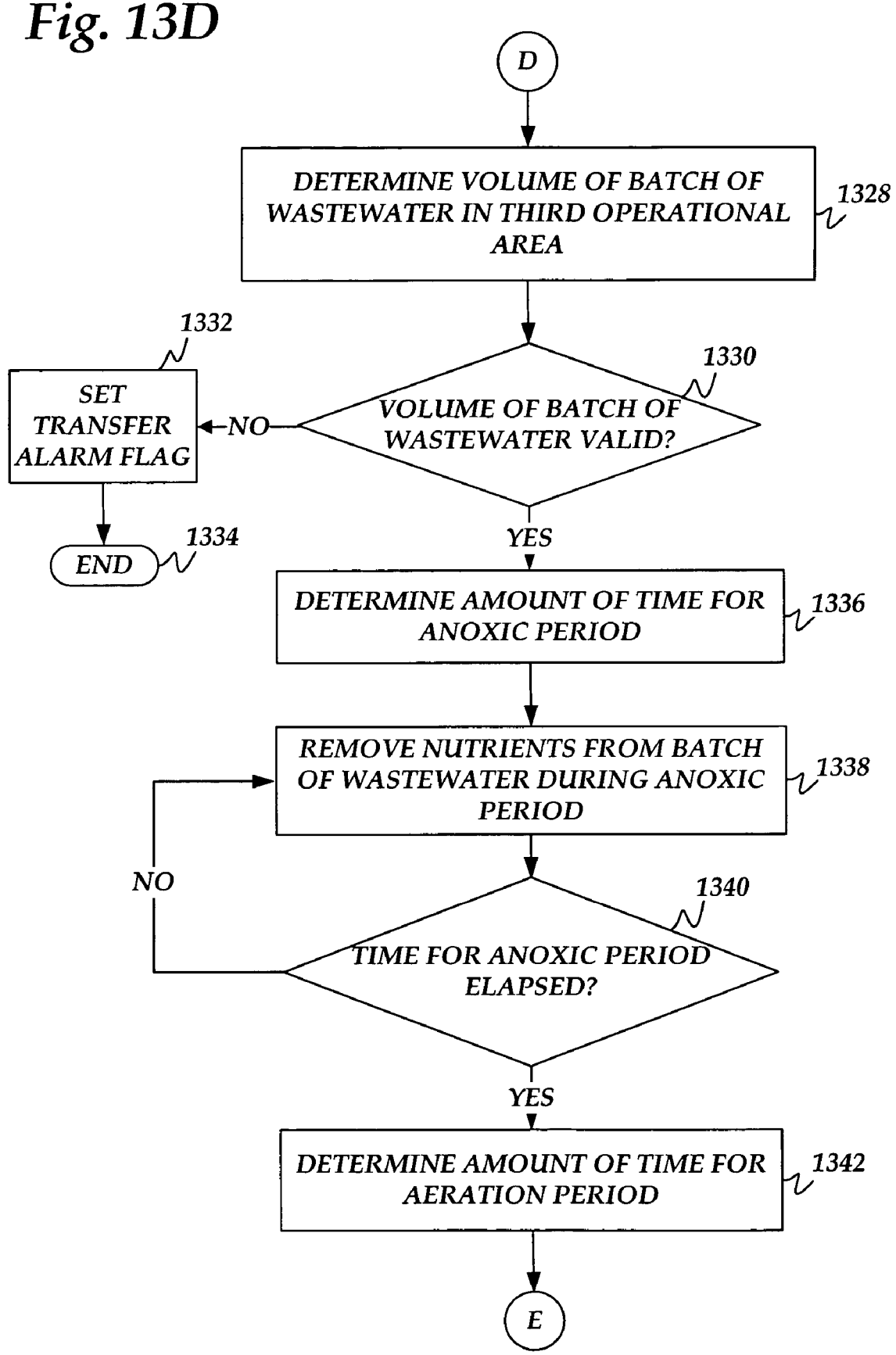
Figure 13E:
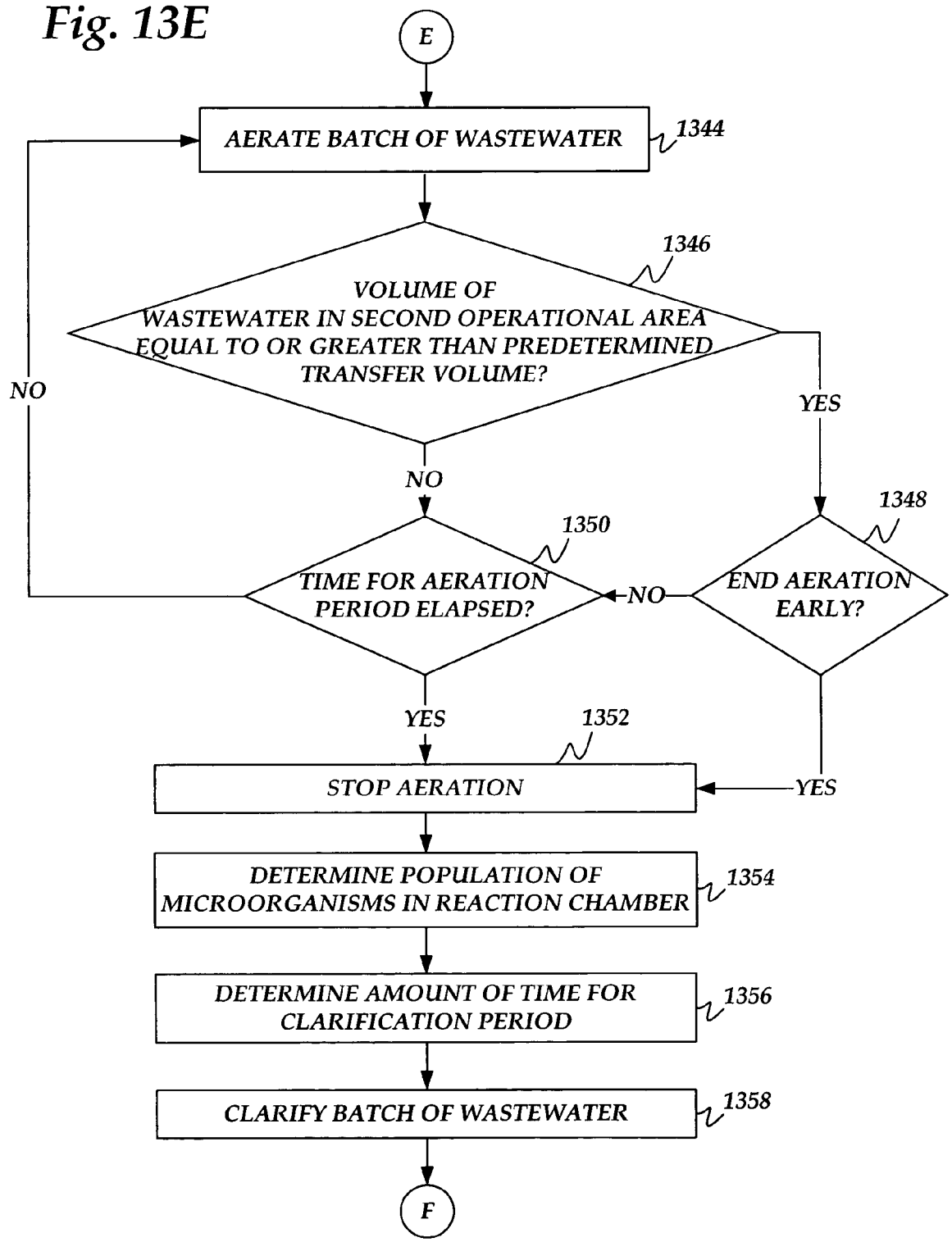
Figure 13F:
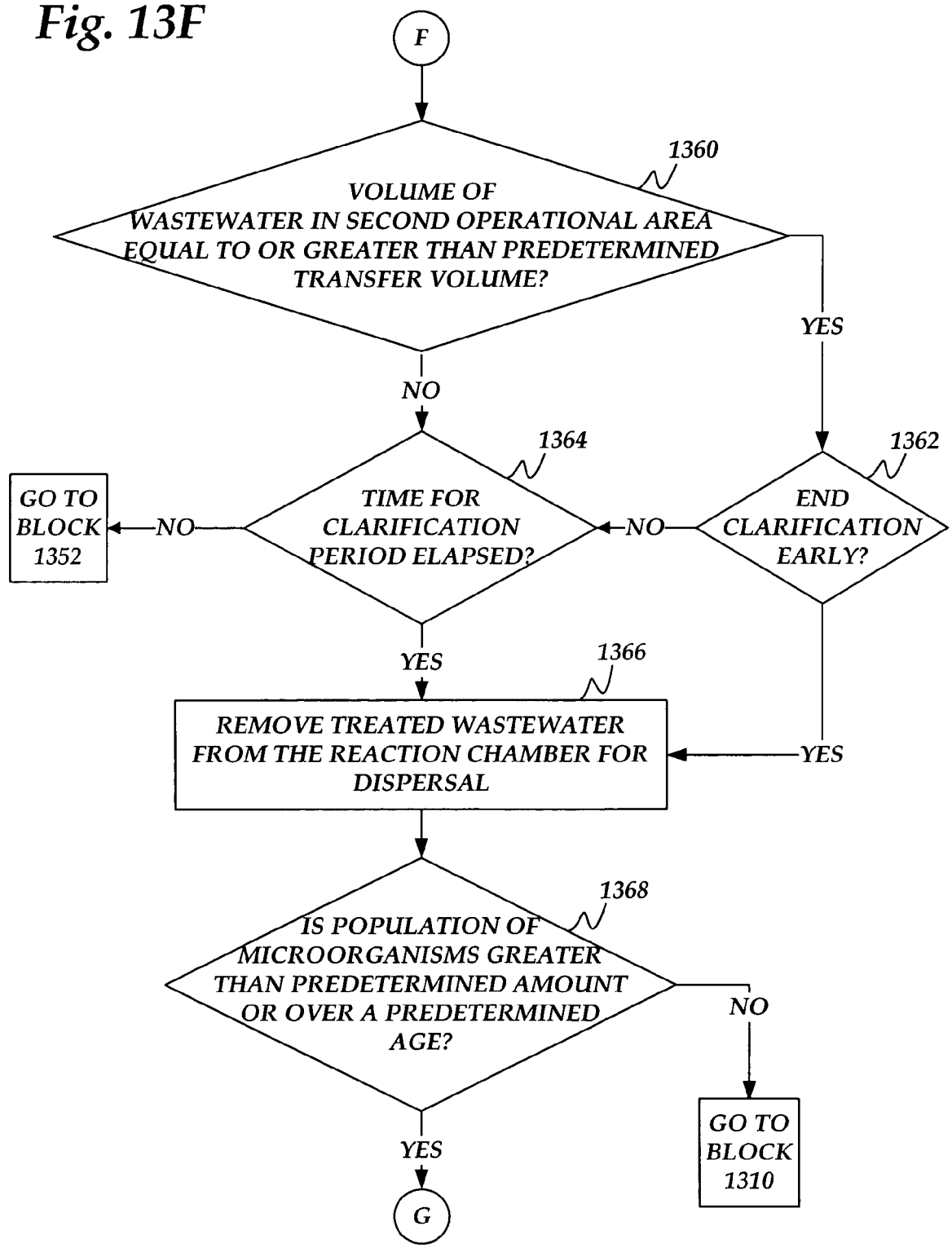
Figure 13G:
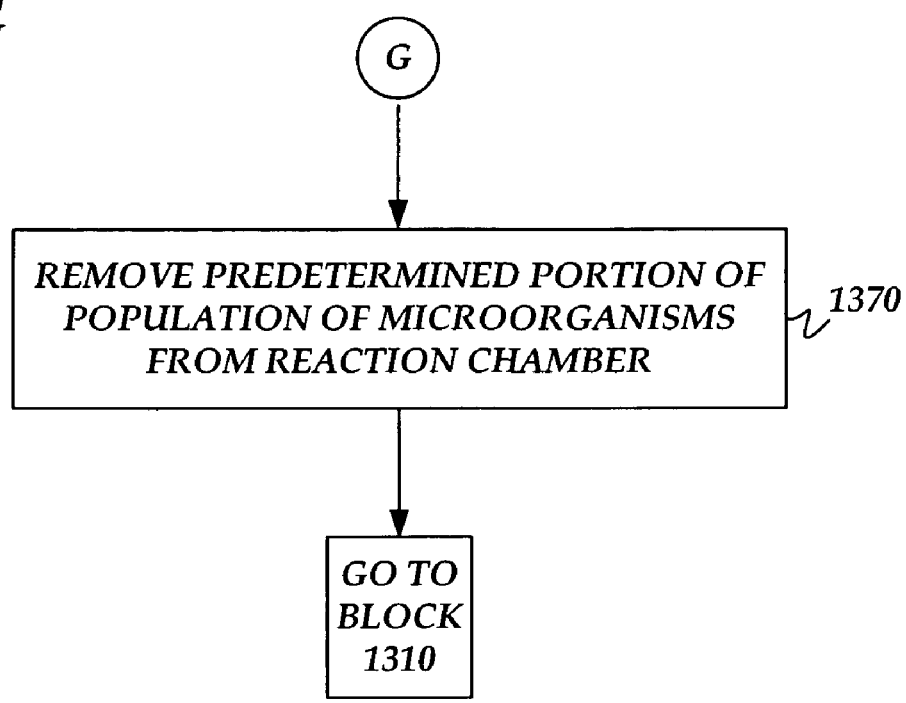

The solid material settling in the second solids settling area 118 may periodically be removed to the receiving chamber 50 by a first airlift pump comprising a pipe 130 (FIG. 6) connected to a common trunk line 40 located above the first and second operational areas and extending from the equalization chamber 90 to the receiving chamber. This second solids settling area 118 is sized relative to the low-to-medium head pressure strength of the airlift to ensure that all the solids will be removed from this area. The basic design and operation of airlift pumps are known to those skilled in the art and need not be repeated herein. The pipe 130 preferably comprises an inlet end 132 located in the second solids settling area 118, which allows solid material that has accumulated in the second solids settling area to enter the pipe, and an outlet end 134 connected to the common trunk line 40, which allows the solid material to be received by the common trunk line. When air is supplied to an air intake opening 136 of the pipe 130, the solid material is moved by the first airlift pump through the pipe and the common trunk line 40 and is discharged into the receiving chamber 50 through an outlet end 42 of the common trunk line located adjacent the baffle 32, as illustrated in FIG. 10B. The transferred solid material will settle into the first solids settling area 86 and remain in that area until broken down and anaerobically digested. Returning the solid material from the equalization chamber 90 to the receiving chamber 50 also causes mixing and displacement of fluids in the receiving chamber, which helps prevent scabbing that may otherwise occur on the surface of the wastewater in the receiving chamber. Furthermore, the suction caused by the first airlift pump creates a downward drag urging any solid material that may be remaining in the first valley region 104 downwardly into the second solids settling area 118. The transfer of the solid material via the first airlift pump from the equalization chamber 90 to the receiving chamber 50 is driven by air supplied from an air source such as an air compressor 260 (FIG. 11), as discussed below.

As wastewater continues to flow into the tank 20, the wastewater in the equalization chamber 90, flows over the apex 126, and into the second valley region 106 of the second operational area 102. The complementary incline 128 and the third side wall 92 of the equalization chamber 90 form the second valley region 106. Any solid material that may remain in the wastewater within the equalization chamber 90 will tend to move downwardly to the third solids settling area 120 located below the second valley region 106. Solid material accumulating in the third solids settling area 120 may be returned to the receiving chamber 50 via airlift through a second airlift pump (FIG. 6) comprising a pipe 138, which extends upwardly and connects to the common trunk line 40. This solids area 120 is also sized to the low-to-medium head pressure strength of the airlift 138. The pipe 138 preferably comprises an inlet end 140 located in the third solids settling area 120 for allowing solid material that has accumulated in the third solids settling area to enter the pipe, and an outlet end 142 connected to the common trunk line 40. When air is supplied through the air intake opening 144 of the pipe 138, the solid material is moved through the pipe and the common trunk line 40 and is discharged into the receiving chamber 50 through the open end 42 of the common trunk line, as illustrated in FIG. 10B. Solid material accumulating in the second and third solids settling areas 118, 120 is preferably transferred to the receiving chamber 50 when the level of the wastewater in the equalization chamber 60 is high in order to provide maximum transfer rate of the solid material via the first and second airlift pumps.

As wastewater continues to flow into the system 10, the wastewater in the second valley region 106 rises until it surpasses the level of the apex 126. After the wastewater in the equalization chamber 90 surpasses the level of the apex 68 of the lower baffle 60 in the receiving chamber 50, the level of wastewater in the equalization chamber and receiving chamber will rise together. At this level, the wastewater in the receiving chamber 50 fills the first operational area 84 and contacts the upper baffle 70 located above and spaced apart from the lower baffle 60, as shown by FIG. 10A. As previously mentioned, the upper baffle 70 ensures that any solid material settling out of the wastewater in the first operational area 84 and the holding area 88 will continue moving downwardly and settle in the first solids settling area 86 instead of flowing into the equalization chamber 90.

When the wastewater reaches the top level of the first operational area 84 of the receiving chamber 50, the wastewater in the equalization chamber 90 contacts the funnel assembly 108 having a first triangular-shaped baffle 109 extending upwardly at an acute angle from the front wall of the equalization chamber to an upper point located adjacent the second side wall 54, a second triangular-shaped baffle 111 extending upwardly at an acute angle from the rear wall of the equalization chamber to an upper point located adjacent the second side wall, and a third triangular-shaped baffle 113 extending upwardly at an acute angle from the third side wall 92 to an upper point joining the first and second triangular-shaped baffles, as best illustrated in FIG. 6. The first triangular-shaped baffle 109, second triangular-shaped baffle 111, and third triangular-shaped baffle 113 thus intersect at an apex 115 (FIG. 3) such that as the level of the wastewater in the equalization chamber 90 rises to completely contact the funnel assembly 108, any solid material floating on the surface of the wastewater will be urged to the apex and transferred to the receiving chamber 50 via the third airlift pump. The third airlift pump comprises a pipe 148 having an inlet end 150 located at or just below the apex 115 of the funnel assembly 108 for receiving the floatable solid material in the pipe, and an outlet end 152 connected to the common trunk line 40, as shown in FIGS. 3 and 6. When air is supplied through an air intake opening 154 of the pipe 148, the solid material is moved through the pipe and the common trunk line 40 and is discharged into the receiving chamber 50 through the outlet end 42 of the common trunk line, as illustrated in FIGS. 10I-J.

To aerobically treat the wastewater, batches of the wastewater are transferred from the second operational area 102 of the equalization chamber 90 to a reaction chamber 166. As illustrated in FIG. 3, the reaction chamber 166 is separated from the equalization chamber 90 by the third side wall 92 and comprises a fourth side wall 170 opposing the third side wall, a front wall, a rear wall opposing the front wall, a top 176, and a bottom 178 opposing the top. The reaction chamber 166 preferably includes a third operational area 180 for receiving the batch of wastewater transferred from the equalization chamber 90, and an activated sludge area 182 below the third operational area for receiving a population of microorganisms. Wastewater transferred from the equalization chamber 90 to the third operational area 180 mixes with the population of microorganisms in the activated sludge area 182. The population of microorganisms is capable of consuming the organic material remaining in the wastewater.

The activated sludge area 182 is preferably sized to hold a population of microorganisms sufficient to biologically process the largest batch of wastewater the treatment system 10 is designed to process within a 24-hour period. Thus, the reaction chamber 166, in a preferred embodiment of the present invention, is sized so that the third operational area 180 can hold and biologically treat the largest volume of wastewater anticipated in a predetermined interval within a 24-hour period. In a preferred embodiment, the period of time to process and transfer a batch of wastewater in the reaction chamber 166 is one hour for anoxic treatment, 2.5 hours of aerobic treatment by aeration, followed by 2.5 hours for clarification, and approximately 22 minutes to transfer the clarified liquid from the reaction chamber. Accordingly, six hours of processing time is required for each batch of wastewater transferred into the reaction chamber. Therefore, for a particular embodiment of the present invention, if the maximum daily expected inflow is 750 gallons, to accommodate three batches of wastewater in a twenty-four hour period, the volume of the third operational area 180 should be 250 gallons. In turn, the volume of the second operational area 102 (including the first and second valley regions 104,106), the second and third solids settling areas 118, 120, and the open space 67 should be at least 250 gallons. Thus, the volume of the first operational area 84 should also be at least 250 gallons to replace the wastewater periodically transferred from the equalization chamber to the reaction chamber. It should be understood that the capacities in the foregoing example may be scaled up or down to treat different maximum volumes of wastewater anticipated over predetermined periods of time.

It will be understood that the rate of wastewater inflow to a localized wastewater treatment system according to the present invention will likely vary from maximum to zero over a typical 24-hour period, and at times will be much less than the maximum volume for which a particular system is designed. Moreover, the makeup of that inflow may vary from rich in dissolved organic material, to very little organic material, to no organic material at all. The localized wastewater treatment system 10, according to certain embodiments of the invention, thus may transfer wastewater from the equalization chamber 90 to the reaction chamber 166 according to the amount of time the wastewater has spent in the equalization chamber 90 or according to the volume of the wastewater in the equalization chamber. For example, the localized treatment system 10, over time, may determine that, for that particular residence or business, 120 gallons of wastewater need to be processed every eight hours. Thus, batches of wastewater will typically be transferred to the reaction chamber 166 based on whether the wastewater has been held in the equalization chamber 90 for the predetermined amount of time, eight hours in the present. If, however, in a given eight-hour period only a lesser amount, e.g., 75 gallons, of wastewater has collected in the equalization chamber 90, the treatment system will preferably opt to transfer the entire 75 gallons to the reaction chamber 166 and process a smaller-than-normal batch to maintain a routine processing schedule. If, on the other hand, a greater-than-normal amount, e.g., 200 gallons, of wastewater accumulates in the equalization chamber 90 in just a four-hour period, the treatment system may preferably determine to shorten the treatment of the previous batch and transfer the 200 gallons to the reaction chamber 166 and process the larger-than-normal batch because when the wastewater reaches a predetermined volume, the system decides to process the wastewater instead of waiting for the predetermined amount of time to expire. Therefore, the localized wastewater treatment system, according to certain embodiments of the present invention, is capable of changing the way the system processes wastewater to accommodate the variations in the flow of wastewater from a residence or business.

The system of the present invention continually monitors the volume of wastewater accumulating in the equalization chamber 90. A first ultrasonic sensor 156, preferably located near the top of the equalization chamber 90, monitors the volume of the wastewater in the equalization chamber by emitting and receiving sound waves through a stilling tube 157 extending through an opening in the third triangular-shaped baffle 113 of the funnel assembly 108. Once emitted from the first ultrasonic sensor 156, the sound waves reflect off the surface of the wastewater in the equalization chamber 90 and are received back by the first ultrasonic sensor. The time that elapses between sending and receiving the sound wave is used by the system processor 248 to determine the level of the wastewater in the equalization chamber 90, and that level is a function of the volume of the wastewater in the chamber. Because the shape of each chamber in the tank 20 of the disclosed embodiment is irregular, the relation between the liquid level in each predetermined vertical fraction measured by the sensor 156 and the volume of liquid corresponding to that measured vertical fraction is initially determined by measuring the actual volume of liquid in each vertical fraction within that chamber. Those fractional volumes are stored as a lookup table in a system processor 248 (FIG. 11), described below, from which the system determines the volume of liquid in the equalization chamber 90 corresponding to any vertical height measured by the ultrasonic sensor 156.

Figure 10C:
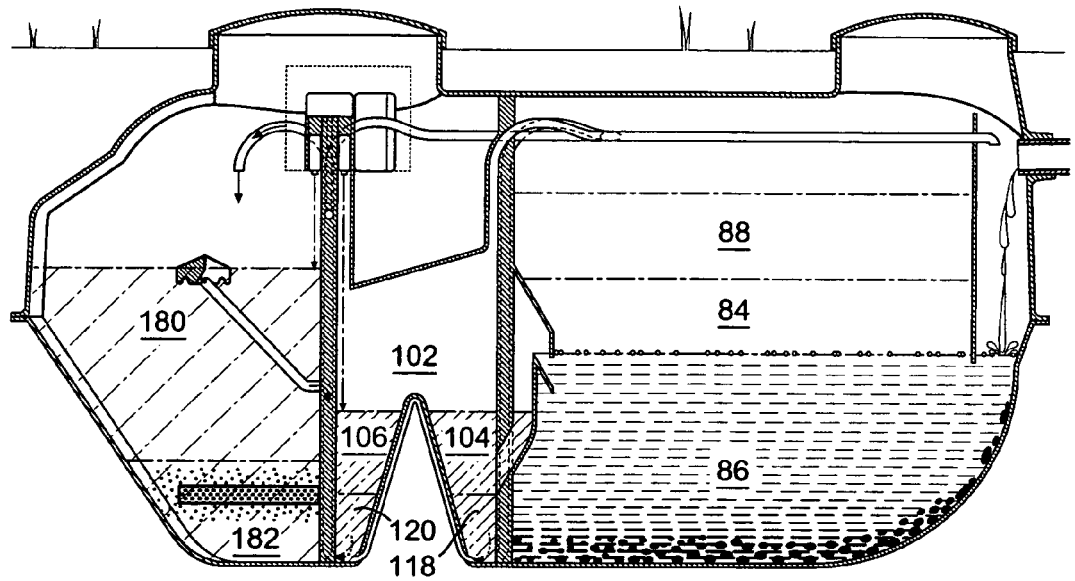

As illustrated in FIGS. 10B-C, once the wastewater in the equalization chamber 90 either is held in the equalization chamber for a predetermined amount of time or reaches a predetermined volume, a batch of the wastewater is transferred from the equalization chamber to the reaction chamber 166 by a fourth airlift pump comprising a pipe 158 having an inlet end 160 located in the second valley region 106 for receiving the wastewater into the pipe, and having an outlet end 162 located near the top of the reaction chamber for discharging the batch of wastewater into the reaction chamber, as illustrated in FIG. 6. In an embodiment of the present invention, the upper end of pipe 158 is curved to locate the outlet end 162 above and directed downwardly toward the maximum intended level of liquid in the reaction chamber 166, so that the wastewater from the second operational area 102 is discharged above the upper surface of the wastewater accumulating in the reaction chamber. When air is supplied through an air intake opening 164 of the pipe 158, the wastewater is moved through the pipe and is discharged into the reaction chamber 166 through the outlet end 162, as shown in FIG. 10C. As the wastewater in the second operational area 102 is transferred to the reaction chamber 166, the wastewater level in the equalization chamber 90 begins to fall, and any wastewater in the first operational area 84 of the receiving chamber 50 flows into the second operational area of the equalization chamber, as illustrated in FIGS. 10C-G. Once the wastewater level in the equalization chamber 90 falls below the apex 126, if no wastewater has accumulated in the first operational area 84, approximately all of the wastewater in the first valley region 104, the second solids settling area 118, and the open space 67 can be transferred to the second valley region 106 by a siphon conduit 139, as shown in FIG. 3. The siphon conduit 139 includes an inlet end located near the bottom of the second solids settling area 118 for receiving the wastewater in the second solids settling area, an outlet end located near the bottom of the third solids settling area 120, and an intermediate point located at a level above the inlet and outlet ends of the siphon conduit. As the wastewater level in the equalization chamber 90 falls below the intermediate point of the siphon conduit 139, the wastewater in the second solids settling area 118 is transferred through the siphon conduit and is discharged into the third solids settling area 120 through the outlet end of the siphon conduit, thereby maintaining the level of liquid in the first valley region 104 substantially the same as in the second valley region 106.

The system, through a second ultrasonic sensor 168 preferably located near the top of the reaction chamber 166, monitors the volume of wastewater transferred to the reaction chamber from the equalization chamber 90. The second ultrasonic sensor 168 emits and receives sound waves similar to the first ultrasonic sensor 156 described above, to determine the volume of the wastewater in the reaction chamber 166 as a function of the measured vertical height of liquid in the reaction chamber. Once the volume of wastewater in the reaction chamber 166 reaches the volume the system determined to transfer from the equalization chamber 90 to the reaction chamber 166, the transfer of the wastewater is stopped. Since the transfer rate of the wastewater by the fourth airlift pump is determinable, the system can establish if the sensors 156, 168 are working properly based on the volume of the wastewater determined by the sensors and the transfer rate of the fourth airlift pump. If the sensors 156, 168 are determined not to be working properly, then an alarm may be signaled indicating that one of the sensors has malfunctioned or that the airflow through one of the airlift pumps is inadequate, possibly due to an air leak. The sensors 156, 168 allow the system to control changes in the flow of wastewater without the need for manual on-site adjustments.

As the transfer of wastewater into the reaction chamber 166 takes place, the wastewater mixes with the microbe biomass (activated sludge) remaining in the activated sludge area 182 from treatment of the previous batch, as illustrated in FIG. 10C. Those microbes, having just been through clarification for, e.g., 2.5 hours followed by approximately 25 minutes for transfer of the previously treated batch of wastewater from the reaction chamber, are now oxygen-starved. Accordingly, as the batch of wastewater is transferred into the reaction chamber 166, the microbes in the activated sludge area 182 of the reaction chamber initially mix with the incoming wastewater and biologically remove nutrients from the wastewater through a process known as denitrification due to the introduction of a carbon source, namely, the new batch of wastewater, and the lack of dissolved oxygen available in the reaction chamber after processing a previous batch of wastewater. For a predetermined amount of time after the batch of wastewater is transferred into the reaction chamber 166, the wastewater undergoes an anoxic period during which certain nutrients are removed from the wastewater.

Figure 10D:
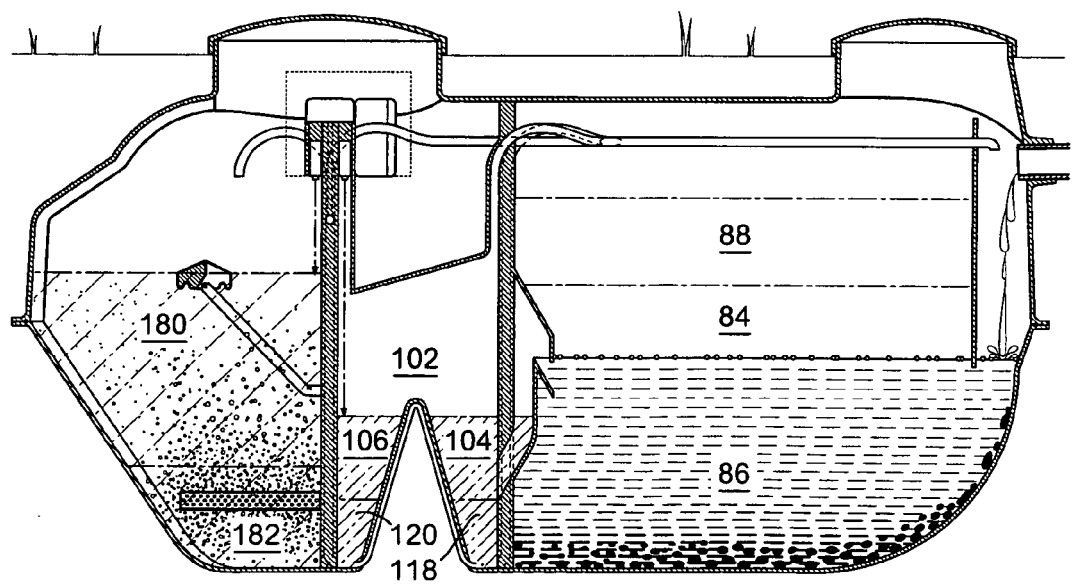

At the conclusion of a predetermined anoxic period, the batch of wastewater is aerated for a predetermined amount of time. To aerate the wastewater in the reaction chamber 166, at least one air diffuser 184 is situated near the bottom of the reaction chamber 166. The air diffuser 184 is connected to a source of air, such as an air compressor, and produces streams of relatively fine air bubbles rising from the bottom of the third operational area 180, mixing the population of microorganisms in the activated sludge area 182 with the batch of wastewater, as illustrated in FIG. 10D. The introduction of air to the reaction chamber 166 causes the population of microorganisms to multiply and consume the organic material remaining in the wastewater. The aeration continues for a period of time determined by the system 10 based on the population of microorganisms in the reaction chamber 166 and the volume of the batch of wastewater. At the end of the aeration period, the air to the diffuser 184 is turned off. Immediately after the air is turned off, the density of the wastewater in the reaction chamber 166 may be measured using a density sensor 186 located within the third operational area 180. The density sensor 186 emits and receives back a signal. Based on the elapsed time between the emission and receipt of the signal, the system processor determines the amount, or population, of microorganisms present in the reaction chamber 166. The system processor stores this value to use when determining the amount of aeration time needed to process the following batch of wastewater.

Figure 10E:
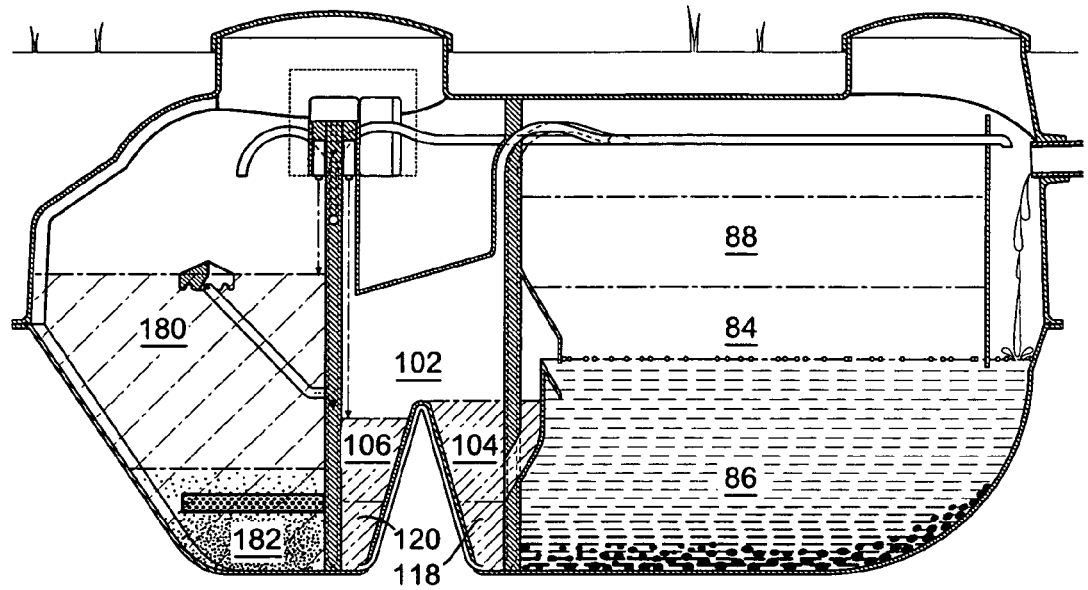
Figure 10F:
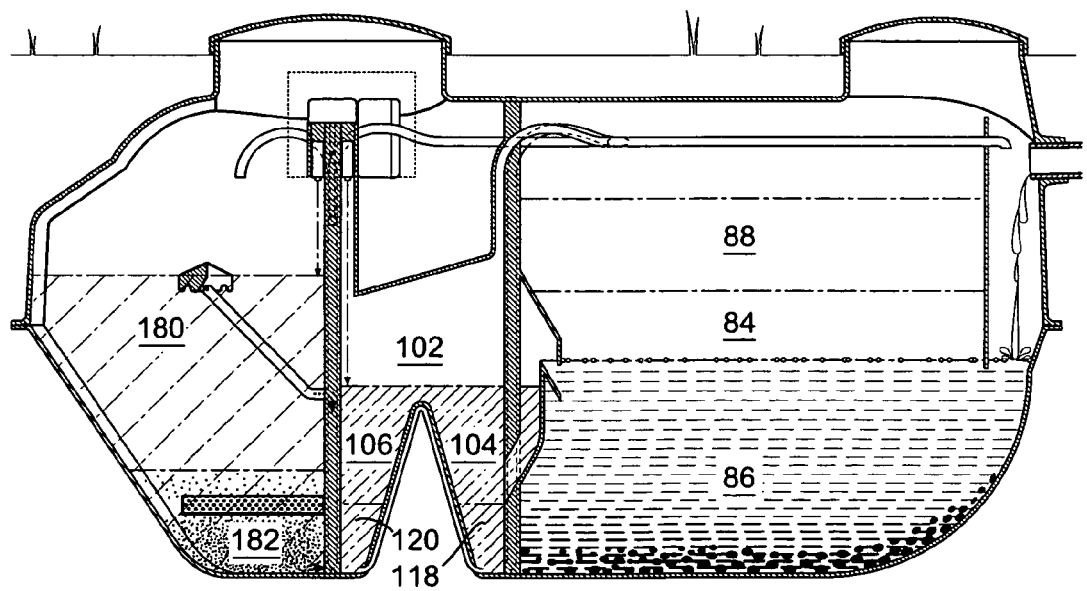
Figure 10G:
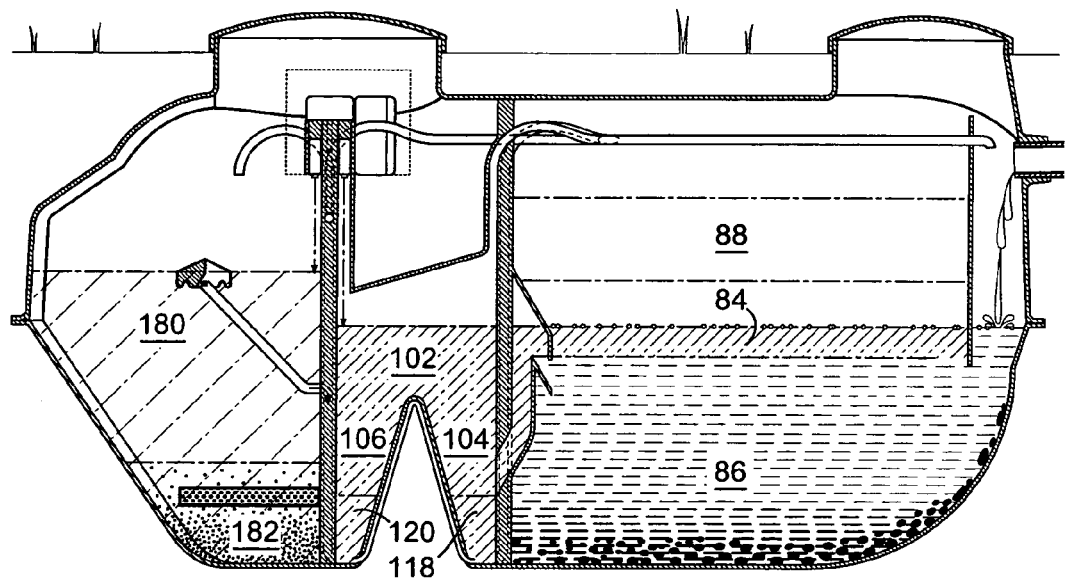

After aeration is turned off in the reaction chamber 166, the wastewater undergoes a clarification phase for a predetermined amount of time. During the clarification phase, the microorganisms in the wastewater of the reaction chamber 166 settle down to the activated sludge area 182 of the reaction chamber, leaving a layer of treated wastewater above the activated sludge area, as illustrated in FIGS. 10E-G. In a preferred embodiment, the microorganisms are allowed to settle out of the treated wastewater for approximately 2.5 hours. As the settling occurs, the microorganisms encounter an incline 188 (FIG. 3) connecting the fourth side wall 170 of the reaction chamber 166 to the bottom 178. The incline 188 urges the microorganisms to move towards the activated sludge area 182 at the bottom of the reaction chamber 166.

As best shown in FIGS. 10C-G, while a batch of wastewater is undergoing aeration and clarification in the reaction chamber 166, wastewater continues to flow into the receiving and equalization chambers 50, 90. However, once a batch of wastewater is completely transferred to the reaction chamber 166, no wastewater is added to that batch of wastewater so that the batch is processed without interruption from an additional flow of wastewater into the reaction chamber 166.

Figure 2:
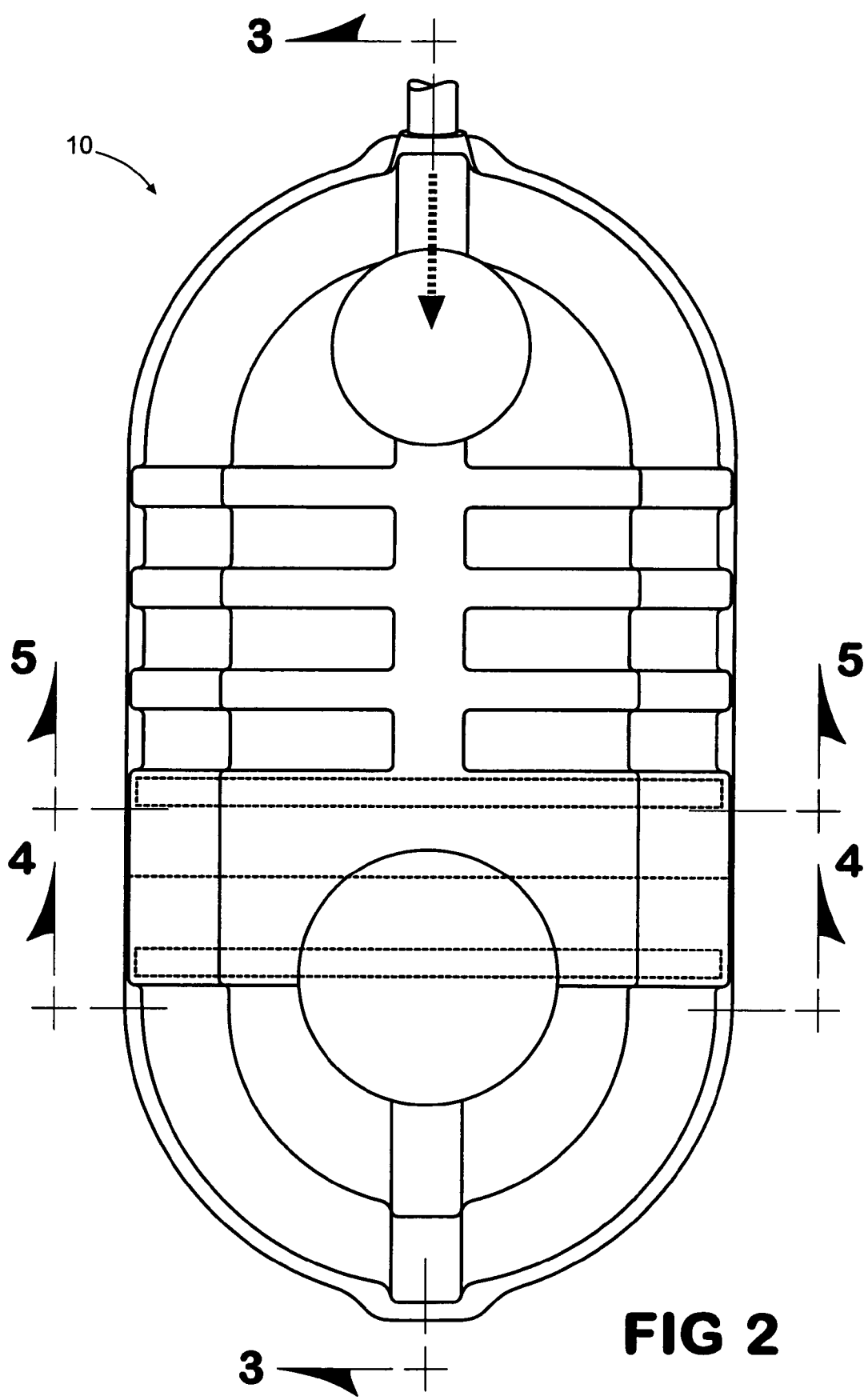
FIG. 2 is a top plan view of the wastewater treatment system shown in FIG. 1.
Figure 10H:
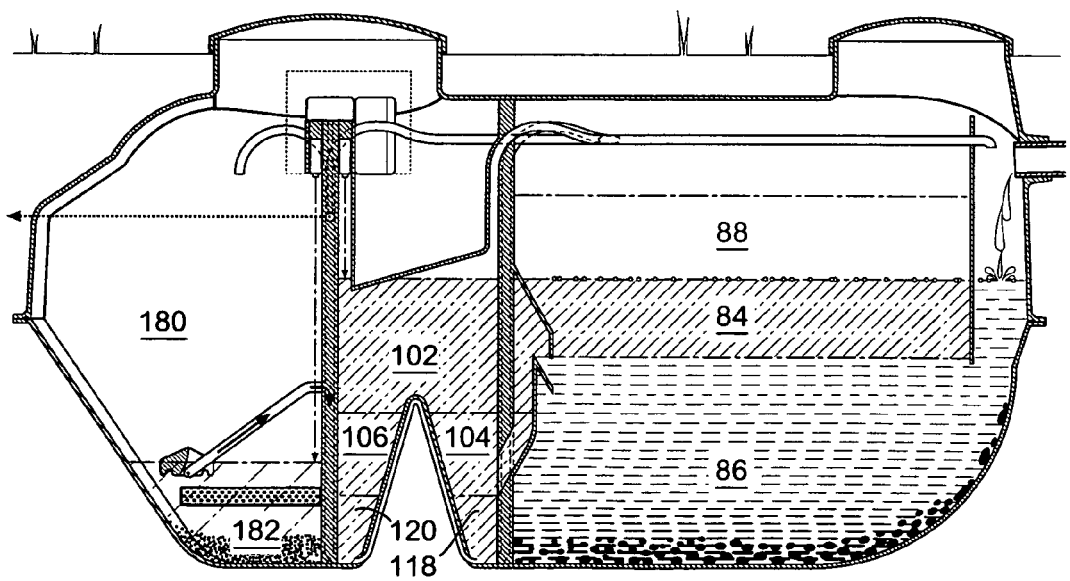
Figure 10I:
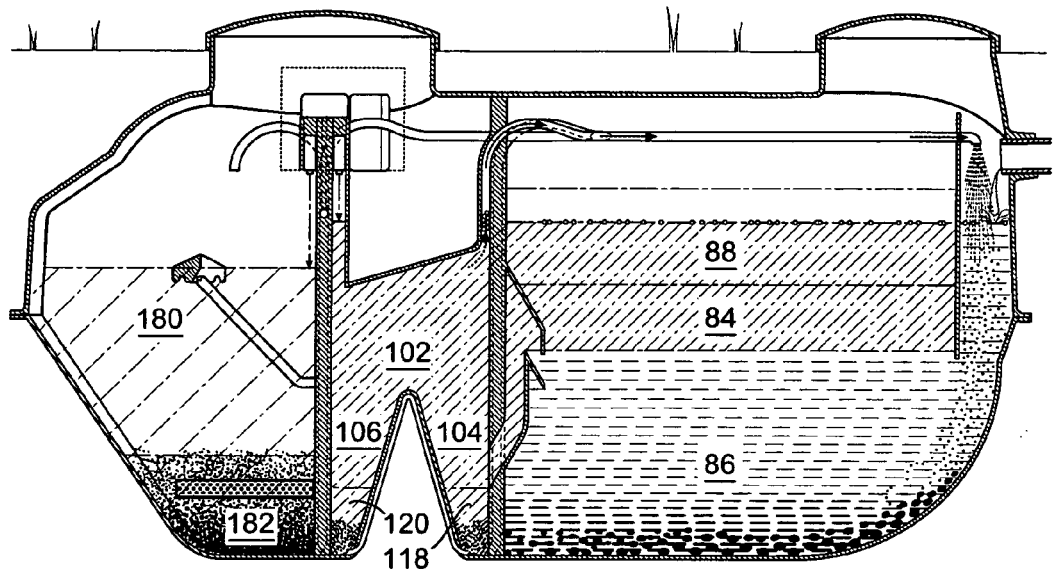
Figure 10J:
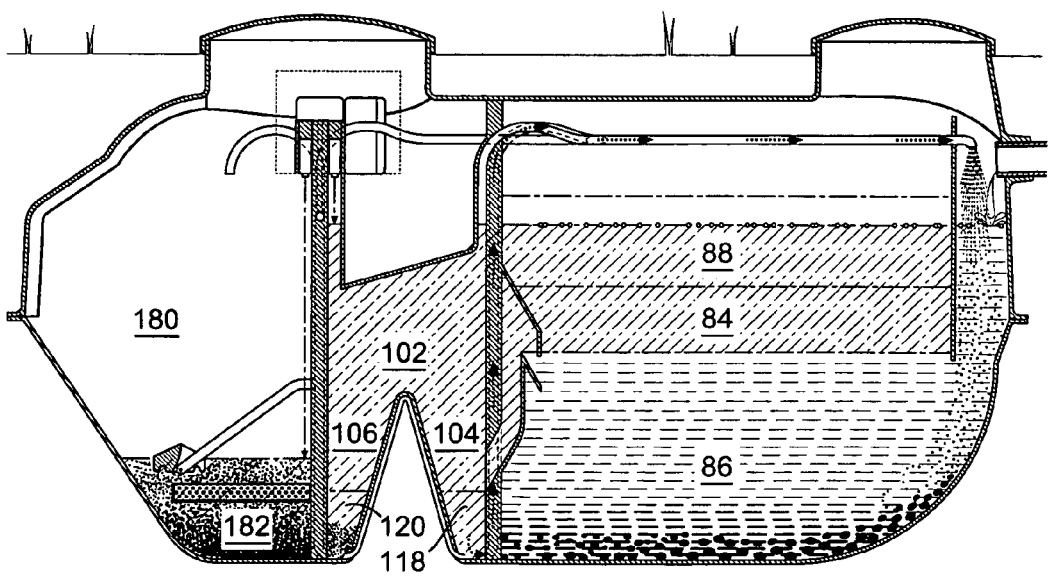
Figure 10K:
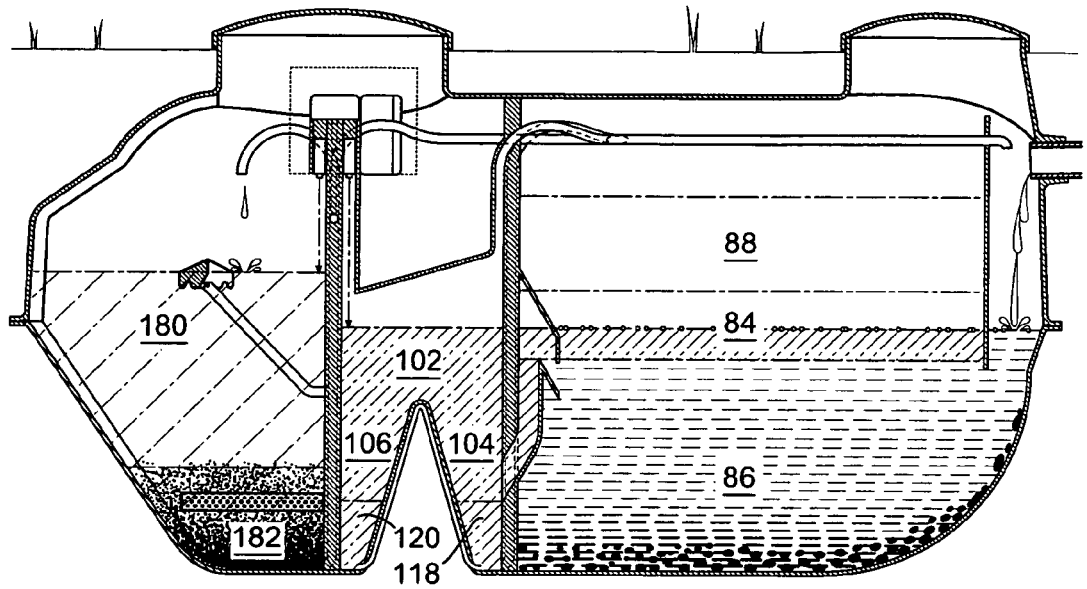
Figure 10L:
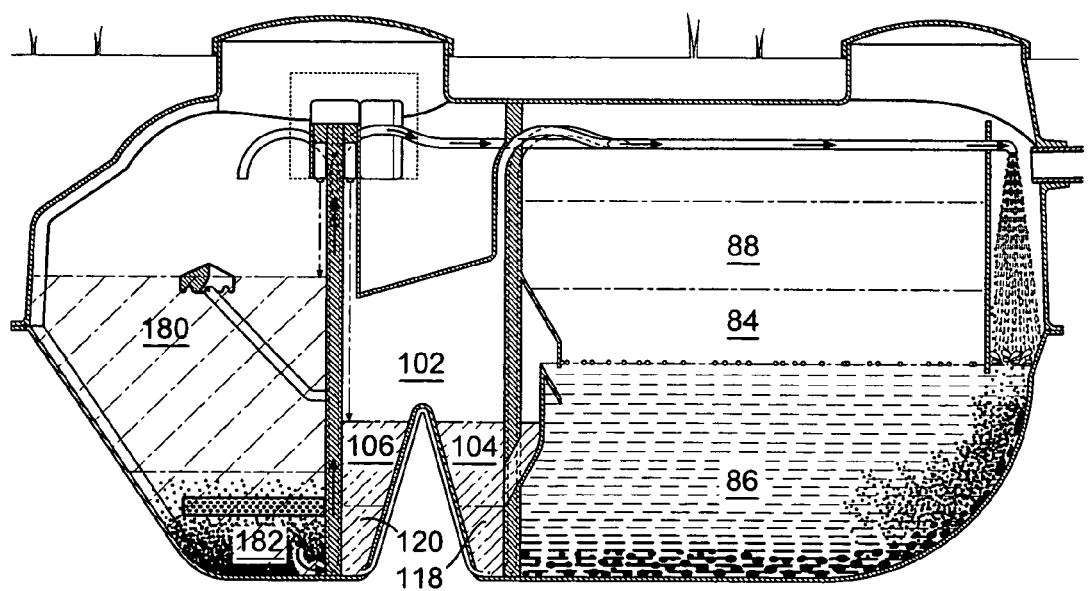

At the end of the clarification phase, a portion of the population of microorganisms that have settled to the activated sludge area 182 may be wasted, or transferred from the reaction chamber 166 to the receiving chamber 50 to control the quantity of microorganisms in the reaction chamber as well as the amount of time the microorganisms remain in the reaction chamber, as illustrated in FIG. 10L. The microorganisms are preferably transferred by a fifth airlift pump shown in FIG. 6 comprising a pipe 190 having an inlet end 192 in the activated sludge area 182 for receiving the microorganisms in the pipe, and an outlet end 194 connected to the common trunk line 40, as illustrated in FIG. 2. When air is supplied through an air intake opening 196 of the pipe 190, the microorganisms are moved through the pipe and the common trunk line 40 and are discharged into the receiving chamber 50 through the outlet end 42 of the common trunk line. The microorganisms are preferably transferred from the reaction chamber 166 to the receiving chamber 50 prior to transferring the batch of wastewater from the reaction chamber in order to provide maximum transfer rate of the microorganisms via the fifth airlift pump.

The microorganisms discharged to the receiving chamber 50 eventually settle to the first solids settling area 86. The wasting of microorganisms from the reaction chamber 166 to the receiving chamber 50 prevents filamentous microorganisms from forming in the reaction chamber due to aging of the microorganisms and prevent overpopulation of the microorganisms. The microorganisms that are transferred to the receiving chamber 50 will attach themselves to organic matter in the receiving chamber, consuming the air as well as the food. Because there is no external airflow into the receiving chamber 50 other than the oxygen in the incoming wastewater, the wasted microorganisms will soon die due to the lack of dissolved oxygen in the receiving chamber.

At the conclusion of the clarification phase, an upper layer of the liquid in the reaction chamber 166 is now substantially clear and devoid of foreign matter, as shown in FIG. 10G. This treated wastewater, or supernatant, in the reaction chamber 166 may be discharged from the reaction chamber to any suitable destination such as a conventional drain field, as described below. Because the population of microorganisms has been allowed to settle to the activated sludge area 182 located below the third operational area 180, the supernatant is preferably removed from just below the surface of the treated wastewater and not from the surface itself, where there might be some remaining floating material. Moreover, as the liquid level drops in the reaction chamber 166, there may be microbes left on the walls that fall onto the surface of the liquid. However, those microbes will remain on the surface due to the surface tension of that liquid and the absence of disturbance at the surface and thus will not be withdrawn with the liquid being removed from just below the surface.

Because it is desirable to remove the treated wastewater from just below the surface, a float assembly 198 is employed as best seen in FIGS. 6-6A. The float assembly 198 preferably comprises a buoyant member 200 and a conduit 206 having an inlet end 208 attached to the buoyant member by a pin 201 and an outlet end 210 (FIG. 6) connected to a pipe 214 having an inlet end 216 and an outlet end 218, as further explained below. The buoyant member 200 includes a U-shaped notch 203 which allows liquid from just below the surface of the treated wastewater to enter the inlet end 208 of the conduit 206 and which allows the conduit to pivot around the horizontal axis of the pin 201 as the buoyant member 200 travels downwardly with the surface level of the liquid in the reaction chamber during the removal of the treated wastewater. The weight of the float assembly 198 is selected so that the inlet end 208 of the conduit 206 is suspended slightly below the surface of the treated wastewater, allowing the treated wastewater from just below the surface to enter the inlet end of the conduit.

The outlet end 210 of the conduit 206 is connected to the inlet end 216 of the pipe 214. In an embodiment of the present invention, the outlet end 210 of the conduit 206 is connected to the inlet end 216 of the pipe 214 by a connector made of a flexible material to allow the conduit to pivot as the buoyant member 200 travels downwardly with the surface level of the liquid in the reaction chamber 166 during the removal of the treated wastewater. In certain embodiments of the present invention, the conduit 206 may be made of a flexible material to permit the conduit to pivot as the surface level of the liquid in the reaction chamber 166 falls due to removal of the treated wastewater, allowing the outlet end 210 of the conduit 206 to be directly connected to the inlet end 216 of the pipe 214 without requiring a connector. The outlet end 218 of the pipe 214 is connected to a first opening of a connector conduit 229, as further described below.

As best shown in FIG. 10H, the treated wastewater is transferred from the reaction chamber 166 to a drain field or other destination such as for example, an irrigation system, by a sixth airlift pump (FIG. 6) comprising a pipe 220 having an inlet end 222 connected to a second opening of the connector conduit 229, an outlet 224 for discharging the treated wastewater to the drain field or other destination, and an air intake 226. When air is supplied through the air intake 226 of the sixth airlift pump, supernatant is drawn into the conduit 206 through the inlet opening 208 by gravity and by suction from that airlift, as indicated by the directional arrows in FIG. 3A. The withdrawn supernatant then enters the inlet opening 216 of the pipe 214 and proceeds downwardly to the outlet end 218 of the pipe, near the bottom of the tank 20. The supernatant passes through the connector conduit 229 and makes a substantial U-turn upwardly into the pipe 220 through the inlet opening 222 toward a curved portion 223 of the pipe 220, located above the highest expected liquid level in the reaction chamber 166. The apex of the curved portion 223 represents the maximum lifting force required by the sixth airlift pump to withdraw the supernatant from the third operational area 180; after liquid passes over that apex, gravity and siphoning effect will pull the supernatant from the third operational area.

As the supernatant is being removed from the third operational area 180, the water level in that area will have an initially rapid rate of descent due to the high beginning head pressure at the inlet end 216 of the pipe 214. As the float assembly 198 moves downwardly, approaching the activated sludge area 182 and falling below the inlet end 216 of the pipe 214, the head pressure declines and the flow rate from that reaction chamber 166 decreases so as not disturb the activated sludge accumulated in that area.

A drain field to which the supernatant is discharged may be a conventional subsurface drain field of the kind commonly used with conventional septic tanks utilizing perforated pipes buried in a bed of gravel, or may include a subsurface irrigation system. The drain field functions to dissipate the treated wastewater, which is not harmful to the surrounding environment and thus may be discharged without the drain-field area requirements associated with conventional septic tanks. Prior to discharging to a drain field or other destination, the treated wastewater may be exposed to an ultraviolet light source to kill any remaining bacteria in the treated wastewater.

Figure 9:
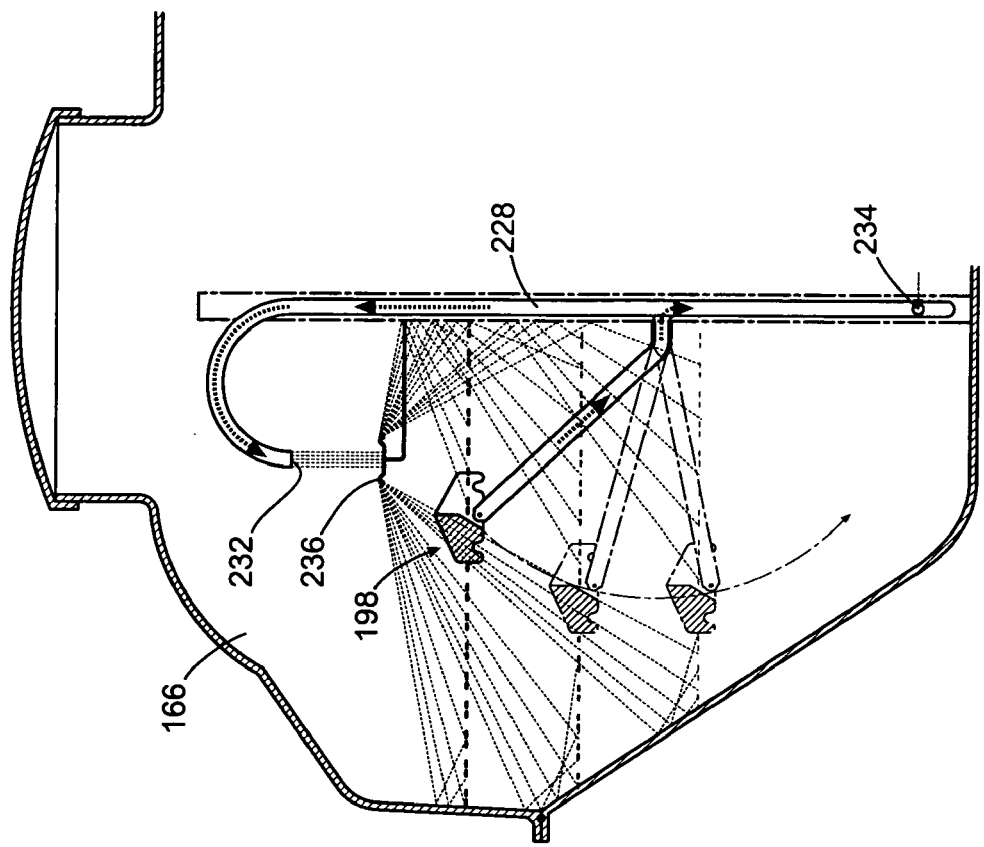
FIG. 9 is a fragmentary cross-sectional elevation view of the reaction chamber and a splatter plate of the wastewater treatment system in FIG. 1.

In certain embodiments of the present invention, a portion of the treated wastewater may be transferred from the reaction chamber 166 back to the reaction chamber to wash the walls of the chamber and disturb the surface of the treated wastewater to cause any microorganisms on the surface to settle to the activated sludge area 182. The portion of the treated wastewater is transferred from the reaction chamber 166 to the reaction chamber by a seventh airlift pump (FIG. 6) comprising a pipe 228 having an inlet end 230 connected to a third opening of the connector conduit 229 and an outlet end 232 located near the top of the reaction chamber for discharging the portion of treated wastewater into the reaction chamber. In an embodiment of the present invention, the upper end of the pipe 228 is curved to locate the outlet end 232 above and directed downwardly toward the maximum intended level of liquid in the reaction chamber 166, as shown in FIGS. 6 and 9. When air is supplied through an air intake opening 234 of the pipe 228, the treated wastewater is drawn into the conduit 206 through the inlet opening 208 by gravity and by suction from the seventh airlift pump, as indicated by the directional arrows of FIG. 9. The withdrawn treated wastewater then enters the inlet opening 216 of the pipe 214 and proceeds downwardly to the outlet end 218 of the pipe, near the bottom of the tank 20. The treated wastewater passes through the connector conduit 229 and makes a substantial U-turn upwardly into the pipe 228 through the inlet opening 230 toward the curved upper end of the pipe, located above the highest expected liquid level in the reaction chamber 166. The apex of the curved upper end of the pipe 228 represents the maximum lifting force required by the seventh airlift pump to withdraw the supernatant from the third operational area 180; after liquid passes over that apex, gravity and siphoning effect will pull the supernatant from the third operational area. Preferably, a splatter plate 236 is positioned below the outlet end 232 of the pipe 228 so that the treated wastewater discharged from the pipe hits the splatter plate and sprays onto the walls of the reaction chamber 166 and the surface of the treated wastewater to remove any microbes that may be remaining on those surfaces, as best shown in FIG. 9.

Figure 8:
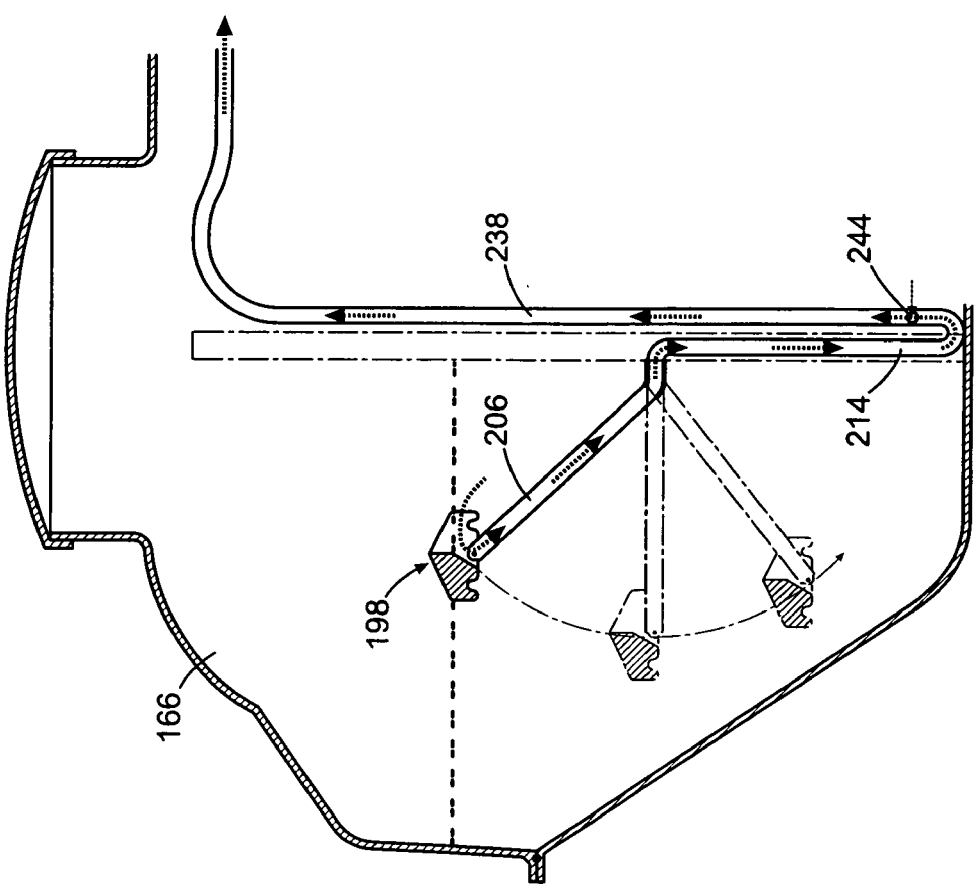
FIG. 8 is a fragmentary cross-sectional elevation view of a reaction chamber and the float assembly of the wastewater treatment system in FIG. 1.
Figure 10M:
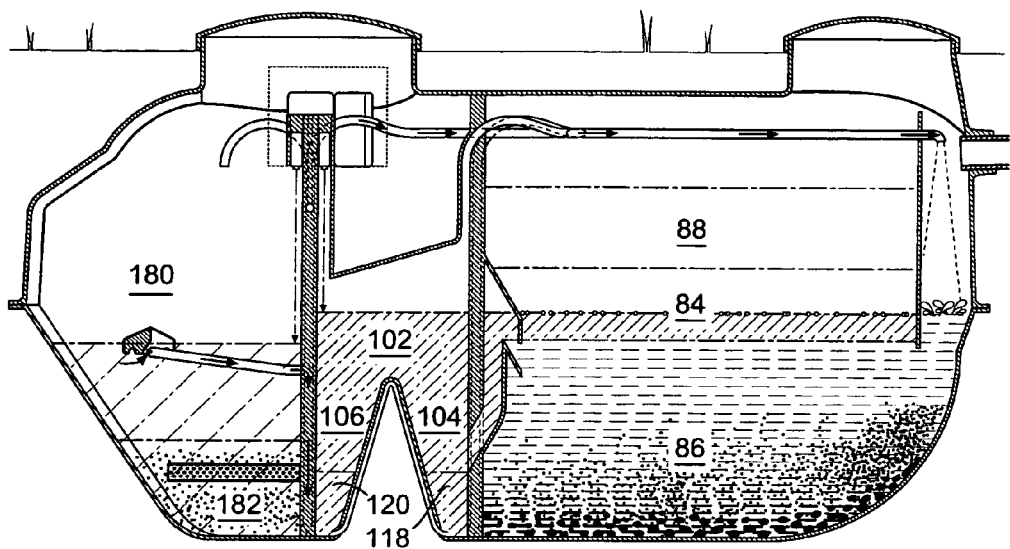

As illustrated in FIGS. 8 and 10M, in further embodiments of the present invention, the treated wastewater in the reaction chamber 166 may be transferred to the receiving chamber 50 via an eighth airlift pump to maintain the population of microorganisms in the reaction chamber 166 during times of low or no flow of new wastewater into the system 10. Similar to the airlift processes described above, the treated wastewater is transferred from the reaction chamber 166 to the receiving chamber 50 by the eighth airlift pump (FIG. 6) comprising a pipe 238 having an inlet end 240 connected to a fourth opening of the connector conduit 229 and an outlet end 242 connected to the common trunk line 40. As indicated by the directional arrows in FIG. 8, when air is supplied through an air intake opening 244 of the pipe 238, the treated wastewater is drawn into the conduit 206 through the inlet opening 208 by gravity and by suction from the eighth airlift pump. The withdrawn treated wastewater then enters the inlet opening 216 of the pipe 214 and proceeds downwardly to the outlet end 218 of the pipe, near the bottom of the tank 20. The treated wastewater passes through the connector conduit 229 and makes a substantial U-turn upwardly into the pipe 238 through the inlet opening 240. The treated wastewater flows into the common trunk line 40 through the outlet end 242 and into the receiving chamber 166 through the outlet end 42 of the common trunk line. As best shown in FIGS. 6B and 7, each of the pipes of the respective airlift pumps may be molded within the walls of the system 10.

As shown in FIG. 6, a multi-port valve 246, of the type described in U.S. patent application Ser. No. 10/227,712, which disclosure is incorporated herein, may be used to control the distribution of air from the air compressor 260 to the airlift pumps and air diffusers in the system 10. The multi-port valve 246 is preferably in communication with a system processor 248 associated with the treatment system 10, as illustrated in. The multi-port valve 246 is preferably located within the tank 20, in a compartment above the third side wall 92, as illustrated in FIG. 3. It will be understood that the positioning of the multi-port valve 246 within the tank 20 and above the third side wall 92, although preferred, is not a critical feature of the embodiment and that other suitable locations, such as outside the tank, may be substituted. The multi-port valve 246 includes a plurality of ports each connected to an airlift pump within the localized treatment system 10 to facilitate transfer of solid material and wastewater via airlift. Other ports of the multi-port valve 246 are connected to air diffusers within the system 10 to control the distribution of air to the air diffusers.

It will be understood that the choice of a multi-port valve 246 to control compressed air distribution in the disclosed embodiment, although preferred, is not a critical feature of that embodiment and that other suitable valves or the like may be substituted.

An exemplary operating environment for implementing the present invention includes the system processor 248 having a processing unit, a system memory, and a system bus that couples the system memory to the processing unit. The system memory contains the programmed instructions for operating the system 10. An interface connects to the system bus and sends and receives signals from the various sensors monitoring the operation of the wastewater treatment apparatus. Those sensors include the first and second ultrasonic sensors 156, 168 monitoring the volume of wastewater in the equalization and reaction chambers 90, 166, respectively, and the density sensor 186 monitoring the population of microorganisms in the reaction chamber. The interface also connects with a drive motor and sensors associated with the multi-port valve 246 to communicate with the multi-port valve. It should be understood that the system processor 248 may also send and receive signals through an external data link 258 (FIG. 11) from sources external to the components of the localized wastewater treatment system.

Those skilled in the art will realize that the system processor 248 also can be connected over any data or telecommunications network, such as the Internet, with an offsite central monitoring system as well as with other localized wastewater treatment systems embodied by the present invention. The system processor 248 can communicate any malfunctions or component failure to the central monitoring system and receive program updates and other information from the central monitoring system. This allows an operator at the central monitoring system to routinely monitor each localized wastewater treatment system in communication with the centralized monitoring system.

In order to decrease costs related to wastewater management infrastructure, municipalities may require new commercial and residential developments to install such localized treatment systems, rather than adding sewer lines and load to the existing centralized treatment facility. It should be understood that such localized sewage treatment systems may be owned by the individual property owner, by the municipality which may charge the property owner a fee for sewage treatment, or by an individual contractor which may also charge a sewage treatment fee.

It should also be understood that localized wastewater treatment systems according to the present invention offer substantial flexibility in treating wastewater. Although a particular treatment process is described herein, modified or different treatment processes may be substituted with little or no modification of the localized treatment apparatus.

Although the present invention has been described with reference to specific details of certain embodiments thereof, it is not intended that such details should be regarded as limitations upon the scope of the invention except as and to the extent that they are included in the accompanying claims.

Figure 4:
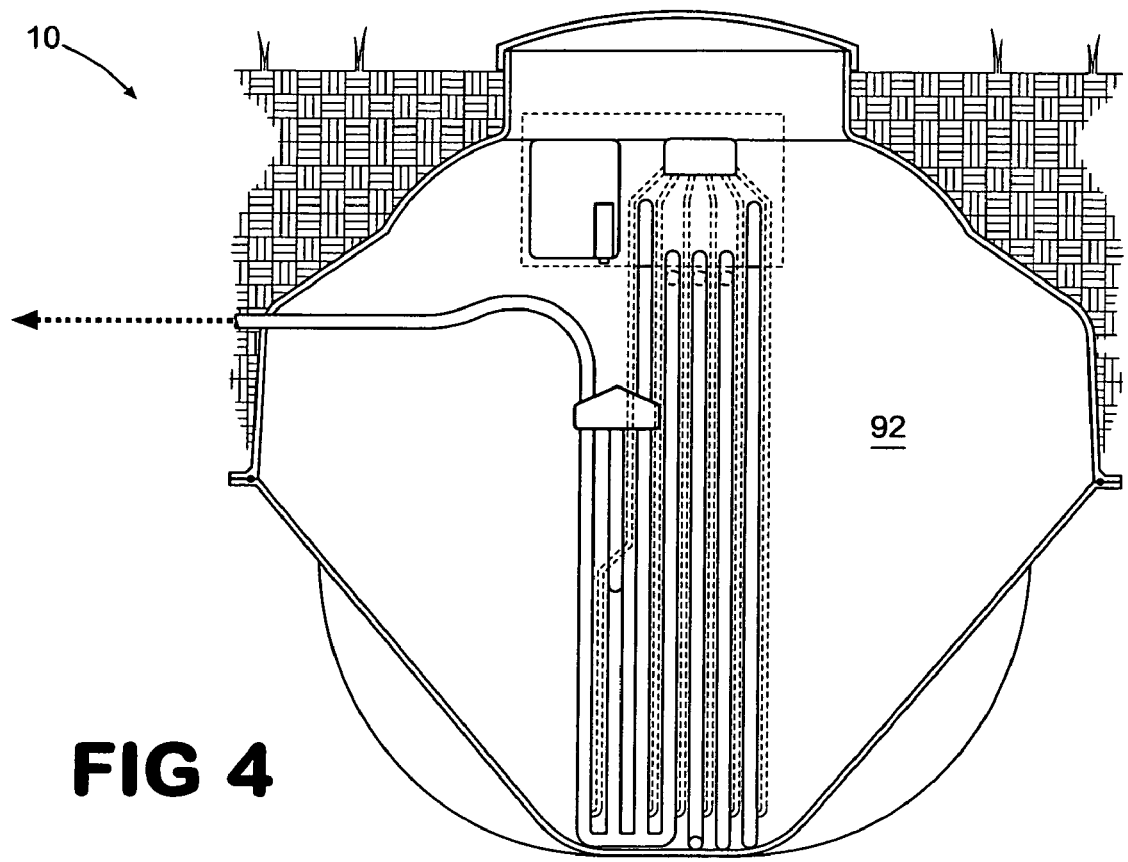
FIG. 4 is a cross-sectional view of the wastewater treatment system taken along lines 4-4 in FIG. 2.

FIGS. 12A-12D and 13A-13F provide a preferred operating process of the present invention used by the localized wastewater treatment system 10. A start-up process 1200 and an operational process 1300 are described herein with reference to the system 10 illustrated in FIGS. 3-4. Prior to receiving the first flow of wastewater, the system controller 248 of the system 10 is programmed with a set of default parameters which is used to process the initial batches of wastewater until a sufficient population of microorganisms is established to treat the wastewater. By the end of the start-up process, a sufficient amount of historic data corresponding to the wastewater flow of a residence or business will be stored at the system controller 10 to determine the particular number of batches of wastewater and the volume of each of those batches that need to be processed in a twenty-four hour period as well as when during that twenty-four hour period the batches of wastewater need to be processed. When a wastewater treatment system 10 of the present invention is initially installed, each of the chambers is empty. As wastewater begins flowing into the receiving chamber 50, the system 10 enters into a start-up period as illustrated by the start-up process 1200. The start-up process 1200 begins at block 1202, where wastewater first entering the system 10 is received in the first solids settling area 86 of the receiving chamber 50. From block 1202, the process 1200 continues to block 1204, where a determination is made whether the wastewater has begun flowing into the first operational area 84. If the wastewater has begun flowing into the first operational area 84, then the process 1200 proceeds to block 1206, where the wastewater is transferred from the first operational area to the second operational area 102 of the equalization chamber 90. As illustrated in FIG. 4, the wastewater is transferred to the second operational area 102 by flowing over the apex 68 of the lower baffle 60 and into the second operational area through the outlet opening 46. As previously mentioned, solid material in the wastewater entering the receiving chamber 90 will settle to the first solids area 86 and float to the surface of the wastewater. The solid material is inhibited from flowing over to the equalization chamber 90 with the wastewater by the upper baffle 70 and the lower baffle 60 of the filter passage 58. If the wastewater has not begun flowing into the first operational area 86, then the process proceeds back to block 1202, where wastewater is continually received in the solids settling area 86 of the receiving chamber 50.

The wastewater flowing over into the equalization chamber 90 begins filling the first valley region 104 of the second operational area 102. The second solids area 118 receives any settlable solid material remaining in the wastewater flowing over from the receiving chamber 50. Any remaining floatable solid material is received by the second filter system 108 installed near the top of the first valley region 104 in the second operational area 102. The wastewater fills the first valley region 104 until the wastewater reaches the apex 126 and begins flowing over to the second valley region 106 of the second operational area 102. When the level of wastewater in the second valley region 106 reaches the apex 126, the raw wastewater begins filling the portion of the second operational area 102 not divided by the partition 122. Once the level of wastewater in the equalization chamber 90 reaches the level of the apex 68 of the lower baffle 60 in the receiving chamber 50, the level of the wastewater in the equalization chamber 90 and the level of the raw wastewater in the receiving chamber 50 begin rising as one because of the open connection between the two chambers.

As the wastewater in the receiving chamber 90 rises above the apex 68, the wastewater fills the first operational area 84 of the receiving chamber 50. In an embodiment of the present invention, the volume of the first operational area 84 is substantially similar to the volume of the second operational area 102 so that when a batch of wastewater is transferred from the equalization chamber 90 to the reaction chamber 166 for aerobic treatment, all of the wastewater in the first operational area flows over to the second operational area. If the receiving chamber 50 continues to receive a flow of wastewater after the first operational area 84 is completely filled, the additional wastewater is received by the holding area 88 of the receiving chamber. When the wastewater in the first operational area 84 flows over to the second operational area 102, any wastewater in the holding area 88 flows into the first operational area where it is held until a batch of wastewater is transferred from the second operational area to the third operational area 180 of the reaction chamber 166.

From block 1206, the process 1200 proceeds to block 1208, where the volume of the wastewater in the equalization chamber 90 is determined. The volume of wastewater in the equalization chamber 90 is measured using the first ultrasonic sensor 156 located near the top of the equalization chamber 90. The first ultrasonic sensor 156 emits a sound wave and receives the sound wave back after the sound wave reflects off the surface of the wastewater in the equalization chamber 90. When the first ultrasonic sensor 156 emits the sound wave, the sensor sends a signal to the system controller 248 indicating that a sound wave has been emitted. Upon receipt of the signal, the system controller starts a timer. When the first ultrasonic sensor 156 receives the reflected sound wave back, the sensor sends another signal to the system controller 248 indicating that the reflected sound wave has been received. Upon receipt of the signal, the system controller stops the timer and determines the timer reading. The amount of time that elapses between sending and receiving the sound wave indicates the level of the wastewater in the equalization chamber 90. The system controller 248 retrieves a volume look-up table saved in the system memory 252 and compares the elapsed time with the entries in the look-up table, which contains a list of predefined volumes and the corresponding elapsed times associated with the predefined volumes. Thus, the system controller 248 is able to determine the volume of the wastewater in the equalization chamber 90 based on the level of the wastewater in the chamber. Moreover, the available capacity of the equalization chamber 90 is also determinable since the total volume of the equalization chamber and the volume of the wastewater in the equalization chamber are known.

From block 1208, the process 1200 proceeds to block 1210, where a determination is made whether the volume of wastewater in the second operational area 102 equals a default transfer volume. As previously mentioned, the system controller 248 of the wastewater treatment system 10 is initially programmed with a set of default parameters that is used to process the initial batches of wastewater received by the system. One of the parameters included in the set of default parameters is the default transfer volume. During the start-up period, when the wastewater in the second operational area 102 reaches the default transfer volume, then a batch of the wastewater is transferred from the second operational area to the third operational area 180 of the reaction chamber 166. This default transfer volume, in an actual embodiment of the present invention, is about 100 gallons. However, as explained in greater detail below, as the wastewater treatment system 10 continues to process wastewater for a particular residence or business, the system utilizes the data stored in the system memory 252 regarding the flow of wastewater for that particular residence or business to determine, on a daily basis, the particular number of batches of wastewater and the volume of each of those batches that need to be processed in a twenty-four hour period. If, at block 1210 the volume of the wastewater in the second operational area 102 is less than the default transfer volume, then the process 1200 proceeds back to block 1208, where the volume of wastewater in the second operational area is determined. On the other hand, if the volume of wastewater in the second operational area 102 is at least equal to the default transfer volume, then the process 1200 proceeds to block 1212.

At block 1212, the amount of time to transfer the batch of wastewater from the second operational area 102 to the third operational area 180 is determined based on the volume of the batch of wastewater in the second operational area and the transfer rate of the fourth airlift pump. From block 1212, the process 1200 proceeds to block 1214, where the batch of wastewater is transferred from the second operational area 102 to the third operational area 180. When the system controller 248 determines that the volume of the wastewater in the second operational area 102 has reached the default volume parameter, the system controller sends a signal to the multi-port valve 246 indicating to supply air to the pipe 158 of the fourth airlift pump. The multi-port valve 246 rotates to the port position that connects the air intake opening 164 of the pipe 158 to the air source, causing air to flow through the pipe. The wastewater received by the inlet end 160 of the pipe 158 is lifted, by the force of the air, through the pipe and into the reaction chamber 166 through the outlet end 162 of the pipe. At block 1216, a determination is made whether the transfer time determined at block 1212 has elapsed. If the transfer time has not elapsed, then the process 1200 proceeds back to block 1214, where the batch of wastewater continues to be transferred from the second operational area 102 to the third operational area 180. If, at block 1216, a determination is made that the transfer time has elapsed, then the process 1200 proceeds to block 1218, where the transfer of the wastewater to the third operational area 180 is stopped.

Once the entire batch of wastewater is transferred to the third operational area 180, no additional wastewater will be added to that chamber until treatment of the batch of wastewater is complete. Moreover, no liquid is removed from the reaction chamber 166 during treatment of the batch. While the batch of wastewater is treated in the reaction chamber 166, wastewater continues to flow into the receiving chamber 50 and over to the equalization chamber 90.

From block 1218, the process 1200 proceeds to block 1220, where the volume of wastewater in the third operational area is determined. The volume of the wastewater in the third operational area 180 is determined through the use of the second ultrasonic sensor 168 preferably located near the top of the reaction chamber 166. The second ultrasonic sensor 168 emits and receives sound waves similar to the first ultrasonic sensor 156 described above, to determine the volume of the wastewater in the third operational area 180 as a function of the measured vertical height of liquid in the reaction chamber. Once the volume of wastewater in the third operational area 180 is determined, the process 1200 proceeds to block 1222.

At block 1222, a determination is made whether the volume of the batch of wastewater in the third operational area 180 is valid. Since the transfer rate of the wastewater by the fourth airlift pump is determinable, the system can establish if the ultrasonic sensors 156, 168 are working properly by comparing the volume of the wastewater in the third operational area 180 with the volume of wastewater calculated as being transferred from the second operational area 102. If the volumes are determined not to be approximately equivalent, then the process 1200 proceeds to block 1224, where a transfer alarm flag is set to indicate that at least one of the sensors 156, 168 is not working properly or that airflow through one of the airlift pumps is inadequate, possibly due to an air leak. From block 1224, the process 1200 proceeds to block 1226, where the process 1200 ends.

If, on the other hand, the volumes are determined to be approximately equivalent, then the process 1200 proceeds to block 1228, where the wastewater in the third operational area 180 is aerated for an extended period of time beyond a default aeration period, which is included in the programmed set of default parameters. When the wastewater treatment system 10 of the present invention initially receives a flow of wastewater, a population of microorganisms must be established to aerobically treat the wastewater. Therefore, during the first weeks of the start-up period, batches of wastewater transferred to the third operational area 180 are aerated, in an actual embodiment, for five hours, which is approximately double the default aeration period to grow a sufficient population of microorganisms. As batches of wastewater are treated, the aeration period decreases based on the increased population of microorganisms, as discussed further below. The introduction of air to the reaction chamber 166 causes the population of microorganisms to multiply and consume the organic material remaining in the wastewater.

From block 1228, the process 1200 proceeds to block 1230, where a determination is made whether the extended aeration period has elapsed. If a determination is made that the extended aeration period has not elapsed, then the process 1200 proceeds back to block 1228. If, however, a determination is made that the extended aeration period has elapsed, then the process 1200 proceeds to block 1232, where a determination is made whether the volume of the wastewater in the second operational area 102 is equivalent to the default transfer volume. If a determination is made that the volume of the wastewater in the second operational area 102 is equivalent to the default transfer volume, then the process 1200 proceeds to block 1236, where the aeration of the batch of wastewater in the third operational area 180 is stopped and the population of microorganisms in the reaction chamber 166 is determined. If, however, at block 1232, a determination is made that the volume of the wastewater in the second operational area 102 is not equivalent to the default transfer volume, then the process 1200 proceeds to block 1234, where the batch of wastewater in the third operational area 180 continues to be aerated. If the wastewater in the second operational area 102 has not reached the default transfer volume, then the aeration of the batch of wastewater in the third operational area 180 is prolonged to continue growing the population of microorganisms in the reaction chamber 166. From block 1234, the process 1200 proceeds back to block 1232, where a determination is made whether the volume in the second operational area 102 is equivalent to the default transfer volume. Again, if the volume of the wastewater in the second operational area 102 is equivalent to the default transfer volume, then the process 1200 proceeds to block 1236.

At block 1236, the aeration of the batch of wastewater is stopped, and the population of microorganisms in the reaction chamber 166 is determined using the density sensor 186 located within the third operational area 180. The density sensor 186 emits and receives back a signal. Based on the elapsed time between the emission and receipt of the signal, the system controller 248 determines the amount, or population, of microorganisms present in the reaction chamber 166. The system controller 248 stores this value in the system memory 252 to use to determine when to end the start-up period, as further discussed below.

From block 1236, the process 1200 proceeds to block 1238, where the batch of wastewater in the third operational area 180 is clarified for a period of time less than a default clarification period, which is included in the programmed set of default parameters. During the clarification period, the microorganisms in the wastewater of the reaction chamber 166 settle down to the activated sludge area 182 of the reaction chamber, leaving a layer of treated wastewater above the activated sludge area. Since, during the start-up period, the population of microorganisms is small relative to the population of microorganisms established during the operational process 1300, the period of time for clarification of the batch of wastewater can be shortened. In an actual embodiment of the present invention, during the first weeks of the start-up period, the batch of wastewater is clarified for 45 minutes.

From block 1238, the process proceeds to block 1240, where a determination is made whether the shortened clarification period has elapsed. If, at block 1240, a determination is made that the shortened clarification period has not elapsed, then the process 1200 proceeds back to block 1238. If, however, at block 1240, a determination is made that the shortened clarification period has elapsed, then the process 1200 proceeds to block 1242, where the batch of treated wastewater is removed from just below the surface of the treated wastewater in the third operational area 180 for dispersal, as described above. After the batch of treated wastewater is removed from the third operational area 180, the process 1200 proceeds to block 1244.

At block 1244, a determination is made whether the microorganisms in the reaction chamber 166 is at the population needed for the operational process 1300. To determine whether the population is sufficient, the system controller 248 compares the population of microorganisms calculated at block 1236 with a default population of microorganisms included in the programmed set of default parameters. If the populations are approximately equivalent, then the process 1200 proceeds to block 1246, where the start-up period is ended. If however, the populations are not approximately equivalent, then the process 1200 proceeds back to block 1206 and the start-up process continues. In one embodiment, a sufficient population of microorganisms may be established within thirty to forty-five days if approximately 400 gallons of wastewater are treated daily.

As batches of wastewater are treated during the start-up process 1200, the aeration period decreases such that by the end of the start-up period, the aeration period of the batches of wastewater is approximately equal to the default aeration period because, by the end of the start-up process, the established population of microorganisms is capable of aerobically treating the batches of wastewater in less time. The clarification period is also affected by the increased population of microorganisms established by the end of the start-up process. As the population of microorganisms increases during the start-up period, the clarification period increases such that by the end of the start-up period, the clarification period of the batches of wastewater is approximately equal to the default clarification period because as the population of microorganisms increases, the time needed for allowing the microorganisms in the wastewater of the reaction chamber 166 to settle down to the activated sludge area 182 of that chamber increases. These variations in the aeration period and clarification period towards the end of the start-up period are all controlled by the system controller 248. Based on the cumulative number of gallons of wastewater processed by the wastewater treatment system from the first batch of wastewater, the system controller 248 modifies the aeration, clarification, and anoxic periods accordingly. For example, in one embodiment, after the system controller 248 determines that approximately 7875 gallons of wastewater have been treated by the wastewater treatment system, which in an embodiments takes approximately 3 weeks, the system controller decreases the amount of time the batches of wastewater are aerated in the reaction chamber 166 from 5 hours to 4 hours and increases the amount of time the batches of wastewater are clarified from 45 minutes to 1.5 hours.

After a sufficient population of microorganisms is established, the process of the system 10 moves from the start-up period to an operational period illustrated by the operational process 1300. During the operational period, instead of using the constant default transfer volume initially programmed into the system controller 248 as the volume of the batch of wastewater to transfer to the reaction chamber 166 for processing, the controller utilizes data stored in the system memory 252 regarding the volume of the wastewater flowing into the equalization chamber 90 over the start-up period to determine how much wastewater typically flows into the wastewater treatment system 10 within a twenty-four hour period and when, during that twenty-four hour period, the system receives the flows of wastewater for the particular residence or business. The system controller 248 analyzes the stored data for that particular residence or business and determines an optimal volume of a batch of wastewater to be treated in order to process three batches of wastewater, each having approximately the same volume, every twenty-four hours so that the time between transfers of the batches of wastewater is approximately equal. Therefore, how the wastewater is processed depends on how much wastewater a particular residence or business generates and when the wastewater is generated during a twenty-four hour period, instead of a constant value used to process wastewater for every residence and business.

For example, based on the data stored during a start-up period for a family of five, the system controller 248 determines that the family typically generates around 450 gallons of wastewater in a twenty-four hour period. The system controller 248 also determines from the data that 300 gallons of wastewater accumulate in the second operational area 102 between 6:30 am and 9:00 am and that 150 gallons accumulate in that area between 6:30 pm and 11:00 pm. Using this information, the system controller 248 may determine that the optimal schedule for treating the wastewater generated by this family is to transfer a batch of wastewater having 150 gallons of the wastewater accumulated between 6:30 am and 9:00 am over to the reaction chamber 166 for processing at 9:00 am. After treatment of that batch of wastewater is complete, which in one embodiment takes approximately 8 hours, another batch of wastewater having the remaining 150 gallons of wastewater accumulated between 6:30 am and 9:00 am is transferred to the reaction chamber 166 for processing around 5:00 pm. After treatment of that batch of wastewater, another batch of wastewater having the 150 gallons of wastewater accumulated between 6:30 pm and 11:00 pm is transferred to the reaction chamber 166 for processing around 1:00 am, and then the cycle begins again with a batch or wastewater having 150 gallons of the wastewater accumulated between 6:30 am and 9:00 am is transferred to the reaction chamber for processing at 9:00 am. Therefore, within one twenty-four hour period starting at 9:00 am, three batches of wastewater, each having a volume of 150 gallons, are transferred to the reaction chamber 166 for processing, each batch being transferred eight hours after the previous batch was transferred. Thus, the system controller 248 determines that the optimal transfer volume for the family of five is 150 gallons of wastewater and that the optimal transfer time is eight hours after the previous batch of wastewater was transferred for treatment. Instead of transferring all 300 gallons of wastewater to the reaction chamber 166 at 9:00 am to be treated and then not transferring another batch of wastewater to be treated until 11:00 pm when 150 gallons of wastewater has accumulated, the system controller 248 determines that batches of wastewater having 150 gallons of wastewater should be transferred to the reaction chamber for treatment based on the volume of wastewater accumulated in the second operational area 102 within a twenty-four hour period and that a batch should be transferred to the reaction chamber approximately eight hours after the previous batch of wastewater was transferred to the reaction chamber for treatment.

If, by the transfer time, a volume of wastewater less than the transfer volume has accumulated in the second operational area 102, then the system controller 248 may determine, based on the stored data for that particular residence or business, a retention time to hold the wastewater in the second operational area until the volume of the wastewater is at least equal to the optimal transfer volume. In particular, the stored data for a residence or business illustrates how much wastewater flows into the system 10 during a twenty-four-hour period and when the wastewater flows into the system during that twenty-four-hour period. For example, if at 9:00 am, the system controller 248 determines that only 100 gallons of wastewater, instead of the typical 300 gallons of wastewater, have accumulated in the second operational area 102, then the system controller may determine to hold the 100 gallons of wastewater in the second operational area 102 for fourteen hours until 11:00 pm, when 150 gallons of wastewater typically accumulate in the second operational area. At 11:00 pm, since 250 gallons of wastewater (100 gallons from the morning and 150 gallons from the evening) have accumulated in the second operational area 102, a batch of wastewater having a volume of 150 gallons is transferred to the reaction chamber 166 for processing. Then, at 7:00 am, if fifty gallons of wastewater have accumulated in the second operational area 102, a batch of wastewater having a volume of 150 gallons is transferred. If, at 7:00 am, fifty gallons have not accumulated, the system controller 248 determines that by 9:00 am, 300 gallons of wastewater typically accumulate in the second operational area 102 and holds the 100 gallons of wastewater until fifty more gallons of wastewater flow into the second operational area before transferring a batch of wastewater to the reaction chamber 166 for treatment. Although the system controller 248 prefers to transfer a batch of wastewater to the reaction chamber 166 for treatment every eight hours, the controller will extend the amount of time between transfers to maintain a batch volume consistent with the determined transfer volume for that residence or business.

In another embodiment, if only 100 gallons of wastewater have accumulated in the second operational area 102 by 9:00 am, then the system controller 248 may decide to process a batch of wastewater having a volume of 100 gallon so that three batches of wastewater, although of different volumes, are transferred to the reaction chamber 166 in a twenty-four hour period.

On the other hand, if the system controller 248 determines that prior to the transfer time, the volume of wastewater accumulated in the second operational area 102 is at least equal to the transfer volume, then the controller may determine, based on the optimal transfer volume and time, to accelerate the time of treatment of the batch of wastewater currently in the reaction chamber 166 so that a batch of the wastewater accumulated in the second operational area prior to the transfer time can be transferred to the reaction chamber for treatment to decrease the likelihood that a larger-than-normal batch of wastewater will need to be processed, which may disturb the population of microorganisms. For example, if, after transferring a batch of wastewater having a volume of 150 gallons from the second operational area 102 to the reaction chamber 166 at 9:00 am, an additional 300 gallons of wastewater accumulate in the second operational area by 11:00 am, then the system controller 248 may determine to expedite the treatment of the batch of wastewater in the reaction chamber 166 from eight hours to four hours so that a batch of wastewater having a volume of 150 gallons may be transferred from the second operational area to the reaction chamber for treatment at 1:00 pm, instead of at 5:00 pm, by reducing the aeration and clarification periods, as further discussed below. The system controller 248 may determine to abbreviate the treatment of one or more batches of wastewater in situations as described above in order to accommodate volumes of wastewater above what typically accumulates in the second operational area 102 within a twenty-four hour period for a particular residence or business.

In another embodiment, if, after transferring a batch of wastewater having a volume of 150 gallons from the second operational area 102 to the reaction chamber 166 at 9:00 am, an additional 300 gallons of wastewater accumulate in the second operational area by 11:00 am, the system controller 248 may determine to continue processing the batch of wastewater transferred to the reaction chamber for the entire processing time, typically 8 hours, and then transfer a batch of wastewater having a volume of 300 gallons to the reaction chamber at 5:00 pm when treatment of the previous batch of wastewater is complete.

The operational process 1300 begins at block 1302, where the receiving chamber 50 receives an inflow of wastewater. From block 1302, the process 1300 proceeds to block 1304, where the wastewater in the first operational area 84 of the receiving chamber 50 is transferred to the second operational area 102 of the equalization chamber 90, as described above and illustrated in FIG. 4.

As the wastewater is being transferred from the first operational area 84 to the second operational area 102 of the equalization chamber 90, a portion of the wastewater accumulating in the second operational area may be periodically transferred back to the receiving chamber 50 to move and blend the wastewater within the two chambers. Moving the wastewater from the equalization chamber 90 to the receiving chamber 50 causes displacement of the wastewater in the receiving chamber 50 and the equalization chamber 90, which prevents the wastewater in areas of both chambers from becoming septic. Moreover, blending the wastewater causes certain characteristics of the wastewater within the two chambers 50, 90, including the amount of total suspended solids and the biochemical oxygen demand, to become substantially uniform and determinable within a range. In particular, by blending the wastewater in the receiving and equalization chambers 50, 90, the amount of total suspended solids in the wastewater of the two chambers typically is between 80 mg/L and 120 mg/L, and the amount of biochemical oxygen demand in the wastewater of the two chambers typically is between 75 mg/L and 100 mg/L. The system 10 of the present invention uses theses values to determine the length of the anoxic period and the aeration period to accommodate the inherent variations in the flow of wastewater. The system controller 248 determines how frequently to transfer a portion of the wastewater back to the receiving chamber 50 and how much of the wastewater to transfer based on the volume of the wastewater in the equalization chamber 90.

The solid material that settles to the second solids area 118 may also periodically be transferred over to the receiving chamber 50. Similar to the transfer process mentioned above, the system controller 248 sends a signal to the multi-port valve 246 indicating to supply air to the pipe 130 of the first airlift pump. The multi-port valve 246 rotates to the port position that connects the air intake opening 136 of the pipe 130 with the source of air, causing air to flow through the pipe. The solid material received by the inlet end 132 of the pipe 130 is lifted, by the force of the air, through the pipe and into the receiving chamber 50 through the outlet end 42 of the common trunk 40. After a predetermined amount of time, based on the transfer rate of the airlift pump, the system controller 248 sends a second signal to the multi-port valve 246 indicating to cease the supply of air to the pipe 130.

At block 1306, as the wastewater flows into the second operational area 102, the volume of the wastewater in the second operational area is determined using the first ultrasonic sensor 156, as described above. From block 1306, the process 1300 proceeds to block 1308, where the amount of time since the last batch of wastewater was transferred from the second operational area 102 to the third operational area 180 is determined. When a batch of wastewater is transferred from the second operational area 102 to the third operational area 180 for treatment, the system controller 248 starts a timer to track the amount of time elapsing from the transfer of the last batch of wastewater.

From block 1308, the process 1300 proceeds to block 1310, where a determination is made whether the volume of the wastewater in the second operational area 102 is at least equivalent to the determined transfer volume for that particular residence or business. If the volume of the wastewater in the second operational area 102 is at least equal to the determined transfer volume, then the process 1300 proceeds to block 1311, where a determination is made whether the transfer time since the previous batch of wastewater was transferred to the third operational area 180 for treatment has elapsed. If the transfer time has elapsed, then the process 1300 proceeds to block 1320, where an amount of time to transfer the batch of wastewater from the second operational area 102 to the third operational area 180 is determined. If the transfer time has not elapsed, then the process 1300 proceeds back to block 1306, where the volume of the wastewater in the second operational area is determined using the first ultrasonic sensor 156. If, however, back at block 1310, the volume of the wastewater in the second operational area 102 is not at least equal to the transfer volume, then the process 1300 proceeds to block 1312, where a determination is made whether the amount of time since the last batch of wastewater was transferred to the third operational area 180 has elapsed. As discussed above, based on the historic data for a particular residence or business, the system controller 248 may determine that the optimal schedule for treating the wastewater is to process three batches, each batch containing 150 gallons of wastewater, every eight hours. Therefore, if, at block 1310, the volume of the wastewater in the second operational area 102 is less than 150 gallons, then at block 1312, a determination is made whether eight hours have elapsed since the last batch of wastewater was transferred to the third operational area 180. If, at block 1312, the determined transfer time has not elapsed, then the process 1300 proceeds back to block 1306, where the volume of the wastewater in the second operational area 102 is determined.

On the other hand, if, at block 1312, the determined transfer time has elapsed, then the process 1300 proceeds to block 1314, where the amount of time to retain the wastewater in the second operational area 102 until the volume of the wastewater in that area is at least equal to the determined transfer volume is determined based on the stored data for that particular residence or business. As discussed above, the stored data for a residence or business illustrates how much wastewater flows into the system 10 during a twenty-four-hour period and when the wastewater flows into the system during that twenty-four-hour period. From block 1314, the process 1300 proceeds to block 1316, where the wastewater in the second operational area 102 is held for the determined retention time. At block 1318, a determination is made whether the retention time has expired. If the retention time has expired, then the process 1300 proceeds to block 1320. If, at block 1318, a determination is made that the retention time has not expired, then the process 1300 proceeds back to block 1316, where the wastewater in the second operational area 102 remains held.

At block 1320, an amount of time to transfer the batch of wastewater from the second operational area 102 to the third operational area 180 is determined. At block 1320, the amount of time to transfer the batch of wastewater from the second operational area 102 to the third operational area 180 is determined based on the volume of the batch of wastewater in the second operational area and the transfer rate of the fourth airlift pump. From block 1320, the process 1300 proceeds to block 1322, where the batch of wastewater is transferred from the second operational area 102 to the third operational area 180. When the system controller 248 determines that the volume of the wastewater in the second operational area 102 has reached the determined transfer volume or that the determined transfer time has elapsed, the system controller sends a signal to the multi-port valve 246 indicating to supply air to the pipe 158 of the fourth airlift pump. The multi-port valve 246 rotates to the port position that connects the air intake opening 164 of the pipe 158 to the air source, causing air to flow through the pipe. The wastewater received by the inlet end 160 of the pipe 158 is lifted, by the force of the air, through the pipe and into the reaction chamber 166 through the outlet end 162 of the pipe. At block 1324, a determination is made whether the amount of time needed to transfer the batch from the second operational area 102 to the third operational area 180 has elapsed. If the amount of time has not elapsed, then the process 1300 proceeds back to block 1322, where the batch of wastewater continues to be transferred from the second operational area 102 to the third operational area 180. If, at block 1324, a determination is made that the amount of time has elapsed, then the process 1300 proceeds to block 1326, where the transfer of the wastewater to the third operational area 180 is stopped.

From block 1326, the process 1300 proceeds to block 1328, where the volume of the wastewater in the third operational area 180 is determined. The second ultrasonic sensor 168 emits and receives sound waves similar to the first ultrasonic sensor 156 described above, to determine the volume of the wastewater in the third operational area 180 as a function of the measured vertical height of liquid in the area. From block 1328, the process 1300 proceeds to block 1330, where a determination is made whether the volume of the batch of wastewater in the third operational area 180 is valid. Since the transfer rate of the wastewater by the fourth airlift pump is determinable, the system controller 248 can establish if the ultrasonic sensors 156, 168 are working properly by comparing the volume of the wastewater in the third operational area 180 with the volume of wastewater calculated as being transferred from the second operational area 102. If the volumes are determined not to be approximately equivalent, then the process 1300 proceeds to block 1332, where a transfer alarm flag is set to indicate that at least one of the sensors 156, 168 is not working properly or that airflow through one of the airlifts is not adequate, possibly due to an air leak. From block 1332, the process 1300 proceeds to block 1334, where the operational process 1300 ends.

If, on the other hand, the volumes are determined to be approximately equivalent, then the process 1300 proceeds to block 1336, where the amount of time for the anoxic period is determined. During the operational period, when a batch of wastewater is transferred from the equalization chamber 90 to the reaction chamber 166, the batch undergoes an anoxic period for a predetermined amount of time during which certain nutrients are removed from the wastewater. When a new batch of wastewater is received in the third operational area 180 of the reaction chamber 166, the population of microorganisms in the activated sludge area 182 of the reaction chamber initially mixes with the incoming wastewater and biologically removes nutrients from the wastewater due to the introduction of a carbon source, the new wastewater, and the lack of dissolved oxygen available in the reaction chamber after processing of a previous batch of wastewater. The system controller 248 determines the amount of time to allow removal of nutrients based on the volume of the batch of wastewater and the total suspended solids and biochemical oxygen demand values obtained by blending the wastewater in the equalization chamber 90 and the receiving chamber 50, as discussed above.

From block 1336, the process 1300 proceeds to block 1338, where nutrients in the batch of wastewater are removed during the anoxic period. When a new batch of wastewater is transferred into the third operational area 180, nutrient removal of the wastewater begins, and the system controller 248 sets a timer. At block 1340, a determination is made whether the time for the anoxic period has elapsed. If the timer set by the system controller 248 has not reached the predetermined amount of time for the anoxic period, then the process 1300 proceeds back to block 1338, where the anoxic period continues. If, on the other hand, the timer has reached the predetermined amount of time for the anoxic period, then the process 1300 proceeds to block 1342.

At block 1342, the system controller 248 determines the amount of time the batch of wastewater needs to be aerated. When the system 10 enters the operational period, a population of microorganisms sufficient to process the wastewater flowing into the system has already been established.

Thus, instead of aerating the batch of wastewater in the third operational area 180 for an extended period of time to establish the population of microorganisms, the system controller 248 uses the determined volume of the batch of wastewater, the population of microorganisms in the activated sludge area 182 determined after the aeration of the previous batch of wastewater, and the total suspended solids and biochemical demand oxygen values achieved by blending the raw wastewater in the receiving and equalization chambers 50, 90 to determine the amount of time to aerate the batch of wastewater. At block 1344, the batch of wastewater is aerated, and the system controller 248 sets a timer to monitor when the predetermined amount of time for the aeration period elapses. Therefore, a batch of wastewater having a particular volume will require less aeration in comparison to a batch of wastewater having a larger particular volume, if the population of microorganisms in the reaction chamber 166 is substantially similar for both batches.

From block 1344, the process 1300 proceeds to block 1346, where a determination is made whether the volume of wastewater in the second operational area 102 is equal to or greater than the determined transfer volume. As discussed above, while a batch of wastewater is being aerated in the reaction chamber 166, wastewater continues to flow into the receiving chamber 50 and over to the equalization chamber 90, and the system controller 248 continues to monitor the volume of the wastewater in the equalization chamber. If, at block 1346, a determination is made that a volume of wastewater at least equal to the transfer volume has accumulated in the second operational area 102 while a batch of wastewater in the reaction chamber 166 is being aerated, the process proceeds to block 1348, where the system controller 248 may determine, based on the volume of the batch of wastewater, the population of the microorganisms in the reaction chamber, and the amount of time the batch has already been aerated, if the aeration can be stopped before the aeration period is complete to expedite processing of the batch so the wastewater in the second operational area 102 having a volume at least equal to the transfer volume can be processed more quickly. If, at block 1348, a determination is made that the aeration can be stopped before the aeration period is complete, the process proceeds to block 1352, where the system controller 248 sends a signal to the multi-port valve 246 indicating to stop the supply of air to the air diffusers 184. If, however, at block 1348, the system controller determines that the aeration of the batch of wastewater should not be stopped prior to completion of the aeration period, then the process 1300 proceeds to block 1350. Similar, if, back at block 1346, a determination is made that the volume of the wastewater in the second operational area 102 is not equal to or greater than the predetermined transfer volume, then the process 1300 proceeds to block 1350.

At block 1350, a determination is made whether the amount of time for the aeration period has elapsed. If the timer set by the system controller 248 has not reached the predetermined amount of time for the aeration period, then the process 1300 proceeds back to block 1344, where the aeration period continues. If, on the other hand, the timer has reached the predetermined amount of time for the aeration period, then the process 1300 proceeds to block 1352, where the aeration of the batch of wastewater is stopped.

From block 1352, the process 1300 proceeds to block 1354, where the population of microorganisms in the reaction chamber 166 is determined. Immediately after aeration of the batch of wastewater is stopped, the density sensor 186 in the reaction chamber 166 sends and receives a signal back in order to determine the population, or amount, of microorganisms within the reaction chamber. When the density sensor 186 sends the signal, the density sensor sends another signal to the system controller 248 indicating that the signal has been emitted. Upon receipt of the signal, the system controller 248 starts a timer. When the density sensor 186 receives the reflected signal, the density sensor sends another signal to the system controller 248 indicating receipt of the reflected sensor. The system controller 248 stops the timer and determines the elapsed time based on the timer reading. The system controller 248 retrieves a density look-up table saved in the system memory 252 and compares the elapsed time with the entries in the look-up table, which contains a list of predefined populations of microorganisms, the corresponding density levels, and the corresponding elapsed times associated with the density levels. Thus, the system controller 248 is able to determine the population of microorganisms in the reaction chamber 166 based on the density of the microorganisms in the batch of wastewater being processed in the reaction chamber. The system controller 248 stores the determined population of microorganisms value in the system memory 252 to use during later batch processes to determine the amount of time of aeration for the next batch of wastewater as well as to determine if the population of microorganisms needs to be reduced, as explained in greater detail below. Alternatively, the population of microorganisms in the reaction chamber 166 after aeration may be determined by the system controller 248 based on the volume of the batch of wastewater transferred from the second operational area 102 to the reaction chamber 166, the amount of time of aeration, and the reproduction rate of the microorganisms.

From block 1354, the process 1300 proceeds to block 1356, where the amount of time for the clarification period is determined. Once aeration of the batch of wastewater has ceased, the batch enters the clarification period. During the clarification period, the batch of wastewater is allowed to stand undisturbed for a predetermined amount of time so that the population of microorganisms can settle by gravity to the activated sludge area 182 of the reaction chamber 166. The system controller 248 determines the amount of time for the clarification period based on the amount of time the population of microorganisms can survive without aeration. In an embodiment of the present invention, the batch of wastewater is clarified for approximately 2.5-3 hours. Once the amount of time for the clarification period is determined, the process 1300 proceeds to block 1358.

At block 1358, the batch of wastewater is clarified, and the system controller 248 starts a timer as the population of microorganisms begins settling out of the wastewater. This settling activity leaves a layer of treated wastewater above the settled population of microorganisms in the activated sludge area 182. At block 1360, a determination is made whether the volume of the wastewater in the second operational area 102 is at least equal to the determined transfer volume. If the system controller 248 determines that the volume of wastewater in the second operational area 102 is at least equal to the determined transfer volume while a batch of wastewater is undergoing clarification in the third operational area 180, then the process 1300 proceeds from block 1360 to block 1362, where the system controller 248 determines if transfer of the treated wastewater from the reaction chamber 166 can commence even though the population of microorganisms has not completely settled out of the wastewater. If, at block 1362, a determination is made that transfer of the treated wastewater can commence before the clarification period is complete, then the process 1300 proceeds to block 1366, where the system controller sends a signal to the multi-port valve 246 indicating to supply air to the pipe 220 of the sixth airlift pump, as discussed above, to remove the treated wastewater from the reaction chamber 166 for dispersal. If, on the other hand, at block 1362, a determination is made that the transfer of the treated wastewater should not commence before the completion of the clarification period, then the process 1300 proceeds to block 1364. Similarly, if, back at block 1360, a determination is made that the volume of the wastewater in the second operational area 102 is not at least equal to the determined transfer volume, then the process 1300 proceed to block 1364.

At block 1364, a determination is made whether the amount of time for the clarification period has elapsed. If the timer set by the system controller 248 has not reached the predetermined amount of time for the clarification period, then the process 1300 proceeds back to block 1358, where the clarification period continues. If, on the other hand, the timer has reached the predetermined amount of time for the clarification period, then the process 1300 proceeds to block 1366.

At block 1366, the treated wastewater is removed from the reaction chamber 166 for dispersal. As discussed above, the layer of treated wastewater may be removed from the reaction chamber 166 and dispersed to a drain field, where that treated wastewater undergoes subterranean dispersion in the usual manner. Because the population of microorganisms has been allowed to settle to the activated sludge area 182, the treated wastewater from just below the surface of the treated wastewater in the reaction chamber 166 is preferably discharged. When the timer set by the system controller 248 at the beginning of the clarification phase reaches the determined settling time, the system controller sends a signal to the multi-port valve 246 indicating to supply air to the pipe 220 of the sixth airlift pump connected to the conduit 214, which is connected to the flexible hose 206 of the float 198. Upon receipt of the signal, the multi-port valve 246 rotates to the port position that connects the air intake opening 226 of the pipe 220 to the air source, causing air to flow through the seventh pipe. The treated wastewater received by the pipe 220 from the conduit 214 is lifted, by the force of the air, through the pipe and to the drain field, as indicated by step 652. Before the treated wastewater is dispersed to the drain field, the treated wastewater may be passed by an ultraviolet light source to eliminate any bacteria remaining in the treated wastewater. After the treated wastewater is removed from the reaction chamber 166 for dispersal, the reaction chamber is available to receive a new batch of wastewater from the equalization chamber 90 for treatment.

From block 1366, the process 1300 proceeds to block 1368, where a determination is made whether the population of microorganisms in the reaction chamber 166 is greater than a predetermined amount indicating that a portion of the population should be removed from the reaction chamber, and a determination is made whether a portion of the microorganisms should be removed from the reaction chamber due to the age of the microorganisms. After the treated wastewater is removed from the reaction chamber 166, the system 10 may remove a portion of the population of microorganisms from the activated sludge area 182 of the reaction chamber to the receiving chamber 50 to maintain a desired population of microorganisms and a desired sludge age in the process. Based on the population of the microorganisms determined by using the density sensor 186 or determined based on the volume of the batch of wastewater, the length of aeration, and the reproduction rate of the microorganisms, the system controller 248 determines what portion of the population of microorganisms, if any, needs to be removed from the reaction chamber 166.

If, at block 1368, a determination is made that the population of microorganisms has reached the predetermined amount or a predetermined age, then the process 1300 proceeds to block 1370, where a portion of the population of microorganisms is removed from the reaction chamber 166. In an actual embodiment of the present invention, if the density of the population of microorganism rises above 2000 mg/L, the system controller 248 will signal the multi-port valve 246 to provide air to the pipe 190 of the fifth airlift pump to transfer the portion of the population of microorganisms above 2000 mg/L from the reaction chamber 166 to the receiving chamber 50 using a similar process as described above. In an actual embodiment of the present invention, a portion of the population of microorganisms is removed from the reaction chamber 166 weekly so that the population of microorganisms is replaced with a new population within a thirty to forty day period. If, on the other hand, at block 1368, a determination is made that the population of microorganisms in the reaction chamber 166 is not greater than the predetermined amount or the predetermined age, then the process 1300 proceeds back to block 1310, and the operational process 1300 continues.

In certain embodiments of the present invention, a process capable of handling smaller-than-normal flows of wastewater into the system 10 is included in the operating process of the present invention. As mentioned above, the system controller 248 uses stored historical data about the flow of wastewater into the wastewater treatment system 10 for a particular residence or business to calculate how often to transfer batches of wastewater to the third operational area 180 and the volume of the wastewater to be included in each of those batches for that particular residence or business. If, after a period of time, the system 10 determines that smaller-than-normal amounts of wastewater are flowing into the system, a portion of the population of microorganisms will be transferred to the receiving chamber 50, as described above, to reduce the population of microorganisms in the reaction chamber 166. When normal flows of wastewater resume, the system 10 will aerate the first normal batches for an extended period of time to build the population of microorganisms back to an amount sufficient for processing the typical volume of wastewater flowing through the system for that particular residence or business.

A process capable of handling times when no new flow of wastewater is received by a system 10 of the present invention may also be included in the operating process of the present invention. A system 10 including a process capable of handling times when no new flow of wastewater is received maintains a reserve of wastewater in the second operational area 102. In one embodiment, the reserve of wastewater has a volume of 100 gallons. If no new wastewater has accumulated in the second operational area 102 by the determined transfer time, then the reserve of wastewater is transferred from the second operational area to the third operational area 180 for treatment to maintain the population of microorganisms even though a new flow of wastewater has not accumulated in the second operational area. If no new wastewater has accumulated in the second operational area 102 after treatment of the reserve wastewater, the system controller 248 may determine to reduce the population of microorganisms and transfer the treated reserve wastewater back to the receiving chamber 50, instead of dispersing the treated reserved wastewater. The treated reserve wastewater will flow over to the second operational area 102 and be transferred to the reaction chamber 166 to undergo treatment again in order to maintain the reduced population of microorganisms. Once a new flow of wastewater enters the system 10, the treated reserve wastewater will be transferred from the reaction chamber 166 for dispersal.

After an extended period of time, preferably 35 days, if no new wastewater has flowed into the system 10, the reduced population of microorganisms in the activated sludge area 182 of the reaction chamber 166 will be removed to the receiving chamber 50 because of the lack of wastewater to maintain the reduced population of microorganisms. When a new flow of wastewater enters the system 10, the start-up process 1200 is utilized by the system to re-establish a sufficient population of microorganisms to aerobically process the flow of wastewater for the particular residence or business.

Although the present invention has been described with reference to specific details of certain embodiments thereof, it is not intended that such details should be regarded as limitations upon the scope of the invention except as and to the extent that they are included in the accompanying claims.

The invention claimed is:

1. A variable process for treating wastewater, comprising:
receiving a flow of wastewater in one operational area;
determining the volume of the wastewater received in the one operational area;
when the volume of the wastewater in the one operational area is at least equal to a default transfer volume, then transferring a batch of the wastewater having a volume equal to the default transfer volume from the one operational area to another operational area for treatment; and
treating the batch of wastewater in the other operational area for an amount of time based on the volume of the batch.

2. The variable process of claim 1, further comprising:
dispersing the treated batch of wastewater from the other operational area.

3. A variable process for treating wastewater, comprising:
receiving a flow of wastewater in one operational area;
determining the volume of the wastewater received in the one operational area;
when the volume of the wastewater in the one operational area is at least equal to a default transfer volume, then transferring a batch of the wastewater having a volume equal to the default transfer volume from the one operational area to another operational area for treatment;
treating the batch of wastewater transferred to the other operational area, wherein treating the batch of wastewater transferred to the other operational area includes aerating the batch of wastewater for a predetermined amount of time based on the volume of the batch of wastewater, clarifying the batch of wastewater for a predetermined amount of time; and
dispersing the treated batch of wastewater from the other operational area.

4. The variable process of claim 1, wherein the other operational area is separate from the first operational area.

5. A variable process for treating wastewater, comprising:
receiving a flow of wastewater in one operational area;
determining the volume of the wastewater received in the one operational area;
when the volume of the wastewater in the one operational area is at least equal to a default transfer volume, then transferring a batch of the wastewater having a volume equal to the volume of the wastewater in the one operational area from the one operational area to another operational area for treatment; and
treating the batch of wastewater in the other operational area for an amount of time based on the volume of the batch.

6. A variable process for treating wastewater, comprising:
monitoring the volume of the wastewater received in one operational area over a period of time;
determining a transfer volume based on the volume of the wastewater received in the one operational area over the period of time;
determining a transfer time based on when the volume of the wastewater is received in the one operational area over the period of time; and
if the volume of the wastewater in the one operational area is at least equal to the transfer volume at the transfer time, then transferring a batch of the wastewater having a volume equal to the transfer volume from the one operational area to another operational area for treatment.

7. The variable process of claim 6, further comprising:
treating the batch of wastewater transferred to the other operational area; and
dispersing the treated batch of wastewater from the other operational area.

8. The variable process of claim 7, further comprising determining a population of microorganisms in the other operational area.

9. The variable process of claim 8, wherein treating the batch of wastewater transferred to the other operational area includes aerating the batch of wastewater for a predetermined amount of time based on the volume of the batch of wastewater and the population of microorganisms in the other operational area.

10. A variable process for treating wastewater, comprising:
monitoring the volume of the wastewater received in one operational area over a period of time;
determining a transfer volume based on the volume of the wastewater received in the one operational area over the period of time;
determining a transfer time based on when the volume of the wastewater is received in the one operational area over the period of time;
if the volume of the wastewater in the one operational area is at least equal to the transfer volume at the transfer time, then transferring a batch of the wastewater having a volume equal to the transfer volume from the one operational area to another operational area for treatment;
treating the batch of wastewater transferred to the other operational area;
determining a population of microorganisms in the other operational area;
wherein treating the batch of wastewater transferred to the other operational area includes aerating the batch of wastewater for a predetermined amount of time based on the volume of the batch of wastewater and the population of microorganisms in the other operational area;
wherein treating the batch of wastewater transferred to the other operational area further includes:

removing nutrients from the batch of wastewater for a predetermined amount of time based on the volume of the batch of wastewater; and clarifying the batch of wastewater for a predetermined amount of time based on the population of microorganisms in the other operational area; and dispensing the treated batch of wastewater from the other operational area.

11. The variable process of claim 8, further comprising if the population of microorganisms increases over a predetermined density, then removing a quantity of the population of microorganisms to maintain the predetermined density.

12. The variable process of claim 7, wherein dispersing the treated batch of wastewater from the other operational area includes removing a layer of the treated wastewater from just below the surface of the batch of wastewater without removing wastewater at the surface.

13. The variable process of claim 6, wherein monitoring the volume of the wastewater received in the one operational area over a period of time includes:

receiving information from a sensor disposed adjacent the one operational area about the level of the wastewater in the one operational area; and comparing the information received from the sensor with volumetric information about the one operational area so as to determine the volume of the wastewater in the one operational area.

14. The variable process of claim 6, further comprising:

if the volume of the wastewater in the one operational area is less than the transfer volume at the transfer time, then determining a retention time to hold the wastewater in the one operational area until the volume of the wastewater in the one operational area is at least equal the transfer volume, wherein the retention time is based on the transfer time;

at the end of the retention time, determining if the volume of the wastewater in the one operational area is at least equal to the transfer volume; and if the volume of the wastewater in the one operational area is at least equal to the transfer volume at the end of the retention time, then transferring a batch of the wastewater having a volume equal to the transfer volume from the one operational area to the other operational area for treatment.

15. The variable process of claim 6, further comprising:

if the volume of the wastewater in the one operational area is less than the transfer volume at the transfer time, then transferring a batch of wastewater having a volume equal to the volume of the wastewater in the one operational area to the other operational area for treatment.

16. The variable process of claim 6, further comprising:

reserving a predetermined volume of the wastewater in the one operational area;

if no wastewater has accumulated in the one operational area by the transfer time, then transferring the reserved volume of the wastewater from the one operational area to the other operational area for treatment; and treating the reserved volume of the wastewater.

17. The variable process of claim 16, further comprising:

after treating the reserved volume of the wastewater, determining the volume of the wastewater in the one operational area;

if no wastewater has accumulated in the one operational area, then transferring the reserved volume of the wastewater from the other operational area to the one operational area; and transferring the reserved volume of the wastewater from the one operational area to the other operational area for treatment.

18. A variable process for treating wastewater, comprising:

monitoring the volume of the wastewater received in one operational area over a period of time;

determining a transfer volume based on the volume of the wastewater received in the one operational area over the period of time;

determining a transfer time based on when the volume of the wastewater is received in the one operational area over the period of time;

if the volume of the wastewater in the one operational area is at least equal to the transfer volume at the transfer time, then transferring a batch of the wastewater having a volume equal to the transfer volume from the one operational area to another operational area, wherein the other operational area includes a population of microorganisms;

aerating the batch of wastewater transferred to the other operational area for a predetermined amount of time based on the volume of the batch of wastewater and the population of microorganisms in the other operational area;

clarifying the batch of wastewater transferred to the other operational area for a predetermined amount of time based on the population of microorganisms in the other operational area; and dispersing the treated batch of wastewater from the other operational area.

19. The variable process of claim 18, further comprising:

while the batch of wastewater transferred to the other operational area is being aerated, determining the volume of the wastewater in the one operational area;

if the volume of the wastewater in the one operational area is equal to or less than the transfer volume, then continuing the aeration of the batch of wastewater for the predetermined amount of time; and if the volume of the wastewater in the one operational area is greater than the transfer volume, then stopping the aeration of the batch of wastewater transferred to the other operational area prior to the expiration of the predetermined amount of time.

20. The variable process of claim 19, wherein stopping the aeration of the batch of wastewater transferred to the other operational area prior to the expiration of the predetermined amount of time includes:

determining if aerating the batch of wastewater transferred to the other operational area for an amount of time less than the predetermined amount of time will treat the batch of wastewater; and if aerating the batch of wastewater transferred to the other operational area for an amount of time less than the predetermined amount of time will treat the batch of wastewater, then aerating the batch of wastewater for the amount of time less than the predetermined amount of time.

21. The variable process of claim 18, further comprising:

while the batch of wastewater transferred to the other operational area is being clarified, determining the volume of the wastewater in the one operational area;

if the volume of the wastewater in the one operational area is equal to or less than the transfer volume, then continuing the clarification of the batch of wastewater for the predetermined amount of time; and if the volume of the wastewater in the one operational area is greater than the transfer volume, then stopping clarification of the batch of wastewater transferred to the other operational area prior to the expiration of the predetermined amount of time.

22. The variable process of claim 21, wherein stopping the clarification of the batch of wastewater transferred to the other operational area prior to the expiration of the predetermined amount of time includes:
   determining if clarifying the batch of wastewater transferred to the other operational area for an amount of time less than the predetermined amount of time will clarify the batch of wastewater; and
   if clarifying the batch of wastewater transferred to the other operational area for an amount of time less than the predetermined amount of time will clarify the batch of wastewater, then clarifying the batch of wastewater for the amount of time less than the predetermined amount of time.

23. A variable process for treating wastewater, comprising:
   receiving a flow of the wastewater in one operational area;
   transferring a batch of the wastewater from the one operational area to another operational area for treatment;
   determining the volume of the batch of wastewater; and
   aerating the batch of wastewater for a predetermined amount of time based on the volume of the batch of wastewater.

24. The variable process of claim 23, further comprising dispersing the treated batch of wastewater from the other operational area.

25. The variable process of claim 24, wherein dispersing the treated batch of wastewater from the other operational area includes removing a layer of the treated wastewater from just below the surface of the batch of wastewater.

26. The variable process of claim 23, wherein determining the volume of the batch of wastewater includes:
   receiving information from a sensor disposed adjacent the other operational area about the level of the wastewater in the other operational area; and
   comparing the information received from the sensor with volumetric information about the other operational area so as to determine the volume of the wastewater in the other operational area.

27. The variable process of claim 23, further comprising:
   removing nutrients from the batch of wastewater for a predetermined amount of time based on the volume of the batch of wastewater; and
   clarifying the batch of wastewater for a predetermined amount of time.

28. A variable process for treating wastewater, comprising:
   receiving a flow of wastewater in a first operational area;
   separating solid material from the wastewater in the first operational area;
   transferring wastewater from the first operational area to a second operational area;
   monitoring the volume of the wastewater transferred to the second operational area over a period of time;
   determining a transfer volume based on the volume of the wastewater transferred to the second operational area over the period of time;
   determining a transfer time based on the volume of the wastewater transferred to the second operational area over the period of time;
   if the volume of the wastewater in the second operational area is at least equal to the transfer volume at the transfer time, then transferring a batch of the wastewater having a volume equal to the transfer volume from the second operational area to a third operational area, wherein the third operational area includes a population of microorganisms;
   determining the population of microorganisms in the third operational area;
   aerating the batch of wastewater transferred to the third operational area for an amount of time based on the volume of the batch of wastewater and the population of microorganisms;
   clarifying the batch of wastewater for an amount of time based on the population of microorganisms; and
   transferring the treated batch of wastewater from the third operational area for dispersal.

29. The variable process of claim 28, wherein separating solid material from the wastewater in the first operational area includes:
   reducing the flow of the wastewater entering the first operational area to promote the separation of the solid material from the wastewater; and
   retaining the wastewater in the first operational area for a period of time to allow the solid material to separate out of the wastewater.

30. The variable process of claim 28, further comprising:
   separating solid material from the wastewater transferred to the second operational area; and
   transferring the solid material separated out of the wastewater from the second operational area to the first operational area.

31. The variable process of claim 28, wherein monitoring the volume of the wastewater transferred to the second operational area over a period of time includes:
   receiving information from a sensor disposed adjacent the second operational area about the level of the wastewater in the second operational area; and
   comparing the information received from the sensor with volumetric information about the second operational area so as to determine the volume of the wastewater in the second operational area.

32. The variable process of claim 28, further comprising:
   after transferring a batch of the wastewater having a volume equal to the transfer volume from the second operational area to a third operational area, determining the volume of the batch of wastewater transferred to the third operational area; and
   if the volume of the batch of wastewater transferred to the third operational area is not equal to the transfer volume, then signaling an alarm.

33. The variable process of claim 32, wherein determining the volume of the batch of wastewater transferred to the third operational area includes:
   receiving information from a sensor disposed adjacent the third operational area about the level of the wastewater in the third operational area; and
   comparing the information received from the sensor with volumetric information about the third operational area so as to determine the volume of the wastewater in the third operational area.

34. The variable process of claim 28, wherein transferring the treated batch of wastewater from the third operational area for dispersal includes removing a layer of the treated wastewater from just below the surface of the batch of wastewater.

35. The variable process of claim 28, further comprising if the population of microorganisms increases over a predetermined density, then removing a quantity of the population of microorganisms to maintain the predetermined density.

36. The variable process of claim 35, wherein removing a quantity of the population of microorganisms to maintain the predetermined density includes transferring the quantity of the population of microorganisms from the third operational area to the first operational area.

37. The variable process of claim 28, further comprising:
reserving a predetermined volume of the wastewater in the second operational area;
if no wastewater has accumulated in the second operational area by the transfer time, then transferring the reserved volume of the wastewater from the second operational area to the third operational area for treatment; and
treating the reserved volume of the wastewater.

38. The variable process of claim 37, further comprising:
after treating the reserved volume of the wastewater, determining the volume of the wastewater in the second operational area;
if no wastewater has accumulated in the second operational area, then transferring the reserved volume of the wastewater from the third operational area to the first operational area;
transferring the reserved volume of the wastewater from the first operational area to the second operational area; and
transferring the reserved volume of the wastewater from the second operational area to the third operational area for treatment.

39. The variable process having an operational process as in claim 18 for treating wastewater and also having a start-up process operative when receiving an initial flow of wastewater, the start-up process comprising:
receiving the initial flow of wastewater in the one operational area;
determining the volume of the initial flow of wastewater received in the one operational area; and
when the volume of the initial flow of wastewater in the one operational area is at least equal to a default transfer volume, then transferring a batch of the initial flow of wastewater having a volume equal to the default transfer volume from the one operational area to the other operational area for treatment.

40. The variable process as in claim 6, wherein:
the transfer volume is a default transfer volume; and further comprising
if the determined volume of wastewater received in a certain period is less than or greater than a predetermined volume, determining at least one of a new default volume and a new transfer time for transferring a batch of the wastewater from the one operational area to the other operational area for treatment.

41. A variable process for treating wastewater, comprising:
receiving a flow of wastewater in one operational area positioned within a wastewater device;
determining the volume of the wastewater received in the one operational area; and
when the volume of the wastewater in the one operational area is at least equal to a default transfer volume, then transferring a batch of the wastewater having a volume equal to the default transfer volume from the one operational area to another operational area positioned within the wastewater device for treatment of the batch of wastewater.

* * * * *